US 6,607,260 B1

(12) United States Patent
Ikeda

(10) Patent No.: US 6,607,260 B1
(45) Date of Patent: Aug. 19, 2003

(54) RECORDING APPARATUS AND RECORDING POSITION CORRECTING METHOD

(75) Inventor: Tetsuhito Ikeda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,644

(22) Filed: Dec. 20, 1999

(30) Foreign Application Priority Data

Dec. 21, 1998 (JP) .......................................... 10-363352
Dec. 14, 1999 (JP) .......................................... 11-355069

(51) Int. Cl.$^7$ ................................................ B41J 2/01
(52) U.S. Cl. ...................................................... 347/19
(58) Field of Search ............................... 347/5, 19, 20, 347/37, 39, 54; 400/709, 709.2

(56) References Cited

U.S. PATENT DOCUMENTS

| | | | |
|---|---|---|---|
| 4,313,124 A | 1/1982 | Hara ........................... | 346/140 |
| 4,345,262 A | 8/1982 | Shirato et al. ............... | 346/140 |
| 4,459,600 A | 7/1984 | Sato et al. ................... | 346/140 |
| 4,463,359 A | 7/1984 | Ayata et al. ................. | 346/1.1 |
| 4,558,333 A | 12/1985 | Sugitani et al. ............. | 346/140 |
| 4,723,129 A | 2/1988 | Endo et al. .................. | 346/1.1 |
| 4,729,036 A | 3/1988 | Ikeda et al. ................. | 358/296 |
| 4,740,796 A | 4/1988 | Endo et al. .................. | 346/1.1 |
| 5,250,956 A * | 10/1993 | Haselby et al. .............. | 347/19 |
| 5,534,895 A * | 7/1996 | Lindenfelser et al. ......... | 347/19 |
| 5,835,108 A * | 11/1998 | Beauchamp et al. .......... | 347/19 |
| 6,084,607 A * | 7/2000 | Matsuda ....................... | 347/19 |
| 6,155,665 A * | 12/2000 | Lee .............................. | 347/19 |

FOREIGN PATENT DOCUMENTS

| | | | |
|---|---|---|---|
| EP | 0 622 220 A2 * | 11/1994 | ............ B41J/11/46 |
| JP | 54-056847 | 5/1979 | ............ B41M/5/26 |
| JP | 59-123670 | 7/1984 | ............ B41J/3/04 |
| JP | 59-138461 | 8/1984 | ............ B41J/3/04 |
| JP | 60-071260 | 4/1985 | ............ B41J/3/04 |

* cited by examiner

Primary Examiner—Craig A. Hallacher
(74) Attorney, Agent, or Firm—Fitzpatrick, Cella, Harper & Scinto

(57) ABSTRACT

In a printer for forming an image by means of main scanning as a reciprocating operation of a recording head and sub-scanning as an operation for feeding a recording medium, an image recording position is automatically and accurately corrected in a main scanning direction and a sub-scanning direction. To achieve this, a reference image extending in the sub-scanning direction is first formed at a first predetermined position on the recording medium during a forward operation of the recording head, while particular images are formed at second predetermined positions on the recording medium during the reciprocating main-scanning operations of the recording head, the first predetermined position being different from that of the second predetermined positions. Next, the reference image and each of the images formed during each of the reciprocating operations are read to measure the interval in the main scanning direction between the reference image and each of the images formed on the recording medium during the reciprocating operations in order to calculate the amount of offset of each image recording position during the reciprocating main-scanning operations, thereby correcting data on the recording images or timings for recording on the recording medium.

47 Claims, 15 Drawing Sheets

RECORDING APPARATUS AND RECORDING POSITION CORRECTING METHOD

This application is based on Japanese Patent Application Nos. 10-363352 (1998) filed Dec. 21, 1998 and 11-355069 (1999) filed Dec. 14, 1999, the contents of which are incorporated hereinto by reference.

BACKGROUND OF THE INVENTION

1. Field of the Invention

The present invention relates to a recording apparatus and a method for adjusting a recording position. More particularly, for instance, the present invention relates to recording position corrections in a serial printer carried out if images are recorded on a recording medium by means of both main scanning in a forward direction of a recording head and main scanning in a reverse direction thereof, or to recording position corrections among a plurality of recording heads carried out if these heads are used for recording.

2. Description of the Related Art

In general, a serial printer includes a recording head mounted therein for reciprocating movement in a main scanning direction of a recording medium. In bi-directional recording in which images are recorded during both a forward and a reverse movements of the head, if, for example, an image portion formed during main scanning in the forward direction and an image portion formed during main scanning in the reverse direction are forced to be continuous in a feeding (sub-scanning) direction of the recording medium, and if a recording position obtained by main scanning in the reverse direction is offset from a recording position obtained by main scanning in the forward direction, the image portions will be discontinuous in the feeding direction of the recording medium. Thus, it is strongly desirable to correct the offset of the recording position between the forward and reverse directions of main scanning beforehand. Hereinafter, this correction is referred to as a bi-directional recording-position correction. The causes of the offset of the recording position during bi-directional recording include a backlash in a gear or a timing belt for transmitting a driving force to reciprocate, in the main scanning direction, a carriage with the recording head mounted thereon.

Conventional bi-directional recording-position correction methods include an automatic bi-directional correction of the recording position based on operations of the carriage. Such a method provides means for detecting the recording position relative to the movement of the carriage in order to detect a difference between the actual movement in the forward direction and the actual movement in the reverse direction when the carriage is driven in the forward and reverse directions by the same amount, thereby adjusting the amount by which the carriage is driven, in the forward and reverse directions. In addition, some of the methods record a plurality of sample images with different recording timings during the forward and reverse movements so that a user can determine an optimal correction amount from these sample images.

In addition, due to the recent trend to record images in colors, some serial printers include a plurality of recording heads on the same carriage or different carriages, which have individual enclosures for ejecting a plurality of color inks. In this case, the plurality of recording heads are separate, so when they are mounted on the carriages, each recording head is likely to be misaligned from its ideal mounting position in the main scanning direction and sub-scanning direction due to the dimensional accuracy of the recording head or the accuracy with which the head is mounted. With this offset of each recording head from the ideal mounting position, a position on a recording medium at which each color image is recorded by each recording head may be offset from its theoretical position, thereby changing the hue (color reproducibility) of recorded images. Thus, it is strongly desirable to appropriately correct the recording position in the main scanning direction (a carriage moving direction) and sub-scanning direction (a paper feeding direction) at which each image (each color) is recorded by each recording head, despite the offset of each recording head from the ideal mounting position. For such corrections, conventional methods record on a recording medium a plurality of sample images obtained using different recording timings for each recording head so that a user can determine an optical correction amount based on a result obtained from the sample images.

However, in reciprocating main scanning for bi-directional recording or recording in the main scanning direction and sub-scanning direction using a plurality of heads, the method for correcting the recording position by essentially recording a plurality of sample images so as to select an optimal correction amount based on a result obtained from the sample images casts a heavy burden on a user and is insufficiently reliable. In addition, in reciprocating main scanning for bi-directional recording, the method for automatically and indirectly correcting the recording position based on the difference in carriage movement between the two directions does not correct actual errors in the recording position in the two directions, so this method may result in inaccurate bi-directional corrections.

SUMMARY OF THE INVENTION

In view of the above problems, it is thus an object of the present invention to automatically and accurately correct the recording position if images are recorded on a recording medium by means of both main scanning in the forward direction of the recording head and main scanning in the reverse direction thereof, while similarly correcting the recording position among a plurality of recording heads if these heads are used for recording.

In the first aspect of the invention, there is provided a recording apparatus for forming an image by means of main scannings as a reciprocating operation of a recording head and sub-scanning as a relative moving operation between the recording head and a recording medium in a direction different from the main scanning direction, comprising:

image formation means for forming predetermined images at predetermined positions on the recording medium during the forward direction main scanning and reverse direction main scanning of the recording head;

image detection means for performing main scanning on the recording medium to detect the predetermined images formed during the forward direction main scanning and reverse direction main scanning;

measuring means for measuring the interval between the predetermined images formed during the forward direction main scanning and reverse direction main scanning, based on output from the image detection means; and data processing means for calculating the amount of offset between the recording position of the image formed during the forward direction main scanning and the recording position of the image formed during the reverse direction main scanning, based on measurements carried out by the measuring means.

In the second aspect of the invention, there is provided a recording position correcting method with respect to a recording apparatus for forming an image by means of main scannings as a reciprocating operation of a recording head and sub-scanning as a relative moving operation between the recording head and a recording medium in a direction different from the main scanning direction, the method comprising the steps of:

forming predetermined images at predetermined positions on the recording medium during the forward direction main scanning and reverse direction main scanning of the recording head;

detecting the predetermined images formed during the forward direction main scanning and reverse direction main scanning, by using image detection means being main scanning on the recording medium;

measuring the interval between the predetermined images formed during the forward direction main scanning and reverse direction main scanning, based on output from the image detection means; and calculating the amount of offset between the recording position of the image formed during the forward direction main scanning and the recording position of the image formed during the reverse direction main scanning, based on measurements carried out by the measuring step.

In any of these aspects, the image formation means or step may form a reference image at a predetermined position on the recording medium during the forward direction main scanning of the recording head, the reference image extending in the sub-scanning direction, while forming particular images at the predetermined position on the recording medium during the forward direction main scanning and reverse direction scanning of the recording head, the predetermined position being different from that of the reference image;

the image detection means or step may perform main scanning on the recording medium to detect the reference image and the particular images formed during the forward direction main scanning and reverse direction main scanning; and the measuring means or step may measure the image interval in the main scanning direction between the reference image and each of the particular images formed during each of the forward direction main scanning and reverse direction main scanning, based on an output from the image detection means.

The image detection means or step may use a sensor placed on a carriage for allowing the recording head to carry out main scanning in the forward and reverse directions.

The measuring means or step may use means for generating a reference clock and means for measuring the interval by counting the reference clock between a point of time at which the image detection means detects, through main scanning, the particular image formed during the forward direction main scanning and a point of time at which the image detection means detecting the reference image through main scanning and between a point of time at which the image detection means detects, through main scanning, the particular image formed during the reverse direction main scanning and a point of time at which the image detection means detects the reference image through main scanning.

Here, the reference clock generation means may be also used as means for generating a clock for defining recording timings for the recording head.

Further, in the above, the image detection means or step may detect the quantity of reflected light resulting from irradiation of the recording medium with light, and may use a sensor for indicating a change in the quantity of reflected light depending on whether an image may be formed on the recording medium.

Here, the measuring means or step may measure the interval by measuring a time interval at which the quantity of reflected light changes while moving the sensor at a constant speed in the main scanning direction relative to the predetermined image, and multiplying the time interval by the speed.

In the third aspect of the invention, there is provided a recording apparatus for forming an image by means of main scanning executed by a plurality of recording heads and sub-scanning as a relative moving operation between the recording heads and a recording medium in a direction different from the main scanning direction, comprising:

image formation means for forming predetermined images at predetermined positions on the recording medium by using the plurality of recording heads;

image detection means for performing scanning on the recording medium to detect the predetermined images formed by the plurality of recording heads;

measuring means for measuring the interval between the predetermined images formed by the plurality of recording heads, based on output from the image detection means; and data processing means for calculating the amounts of offset of the recording positions of the images formed by the plurality of recording heads, based on measurements carried out by the measuring means.

In the fourth aspect of the invention, there is provided a recording position correcting method with respect to a recording apparatus for forming an image by means of main scanning executed by a plurality of recording heads and sub-scanning as a relative moving operation between the recording heads and a recording medium in a direction different from the main scanning direction, the method comprising the steps of:

forming predetermined images at predetermined positions on the recording medium by using the plurality of recording heads;

detecting the predetermined images formed by the plurality of recording heads by using image detection means being scanning on the recording medium;

measuring the interval between the predetermined images formed by the plurality of recording heads, based on output from the image detection means; and calculating the amounts of offset of the recording positions of the images formed by the plurality of recording heads, based on measurements carried out by the measuring step.

In any of the third and fourth aspects, the image formation means may form a reference image at a predetermined position on the recording medium during the forward or reverse direction main scanning of one of the recording heads, the reference image extending in the sub-scanning direction, while forming particular images at predetermined positions on the recording medium in the main scanning direction by the plurality of recording heads, the predetermined positions being different from that of the reference image;

the image detection means may perform main scanning on the recording medium to detect the reference image and the particular images formed by the recording heads; and the measuring means may measure the interval in the main scanning direction between the reference image and each of the particular images formed by the plurality of recording heads, based on output from the image detection means.

Here, the image detection means may use a sensor placed on one carriage for integrally holding the plurality of recording heads for main scanning or one of a plurality of carriages for individually holding the plurality of recording heads for main scanning.

Further, the measuring means or step may use means for generating a reference clock and means for measuring the interval by counting the reference clock between a point of time at which the image detection means detects, through main scanning, each of the particular image formed by each of the plurality of recording heads and a point of time at which the image detection means detects the reference image through main scanning.

Here, the reference clock generation means may be also used as means for generating a clock for defining recording timings for the recording heads.

Alternatively, in the third and forth aspect, the image formation means or step may form a reference image at a predetermined position on the recording medium during the forward or reverse direction main scanning of one of the recording heads, the reference image extending in the main scanning direction, while forming particular images at predetermined positions on the recording medium in the main scanning direction by using the plurality of recording heads, the predetermined position being different from that of the reference image;

the image detection means or step may perform sub-scanning on the recording medium to detect the reference image and the particular images formed by the recording heads; and the measuring means or step may measure the interval in the sub-scanning direction between the reference image and each of the particular images formed by each of the plurality of recording heads, based on output from the image detection means.

Here, the image detection means or step may use a sensor placed on one carriage for integrally holding the plurality of recording heads for main scanning or one of a plurality of carriages for individually holding the plurality of recording heads for main scanning, and may set the carriage at a position in the main scanning direction at which the sensor detects the reference image and the particular image during sub-scanning of the recording medium.

The measuring means or step may use means for generating a reference clock and means for measuring the interval by counting the reference clock between a point of time at which the image detection means detects, through sub-scanning, each of the particular image formed by each of the plurality of recording heads and a point of time at which the image detection means detects the reference image through sub-scanning.

Here, the reference clock generation means may be also used as means for generating a clock for defining recording timings for the recording heads.

Further, a drive source for the sub-scanning may perform rotating motions, and the particular image may be formed at a position corresponding to an integral multiple of a travel distance obtained by a single rotation of the drive source.

Moreover, the image detection means or step may detect the quantity of reflected light resulting from irradiation of the recording medium with light, and may use a sensor for indicating a change in the quantity of reflected light depending on whether an image may be formed on the recording medium.

Further, the measuring means or step may measure the interval by measuring a time interval at which the quantity of reflected light changes while moving the sensor at a constant speed relative to the predetermined image, and multiplying the time interval by the speed.

In the fifth aspect of the invention, there is provided a recording apparatus for forming an image by means of main scanning as a reciprocating operation of a recording head and sub-scanning as a relative moving operation between the recording head and a recording medium in a direction different from the main scanning direction, comprising:

image formation means for forming predetermined images at predetermined positions on the recording medium during the forward direction main scanning and reverse direction main scanning of the recording head;

image detection means for performing main scanning on the recording medium to detect the predetermined images formed during the forward direction main scanning and reverse direction main scanning; and data processing means for determining a center position of the predetermined image in the main scanning direction from detection start and end positions of the predetermined image associated with main scanning by the image detection means, and calculating the amount of offset between the recording position of the predetermined image formed during the forward direction main scanning and the recording position of the predetermined image formed during the reverse direction main scanning, based on the main-scanning direction center positions of the predetermined images formed in the forward direction main scanning and reverse direction main scanning.

In the sixth aspect of the invention, there is provided a recording position correcting method with respect to a recording apparatus for forming an image by means of main scanning as a reciprocating operation of a recording head and sub-scanning as a relative moving operation between the recording head and a recording medium in a direction different from the main scanning direction, the method comprising the steps of:

forming predetermined images at predetermined positions on the recording medium during the forward direction main scanning and reverse direction main scanning of the recording head;

detecting the predetermined images formed during the forward direction main scanning and reverse direction main scanning, by using image detection means being main scanning on the recording medium; and determining a center position of the predetermined image in the main scanning direction from detection start and end positions of the predetermined image associated with main scanning by the image detection means, and calculating the amount of offset between the recording position of the predetermined image formed during the forward direction main scanning and the recording position of the predetermined image formed during the reverse direction main scanning, based on the main-scanning direction center positions of the predetermined images formed in the forward direction main scanning and reverse direction main scanning.

In any of the fifth and sixth aspects, the image formation means or step may form a reference image at a predetermined position on the recording medium during the forward direction main scanning of the recording head, the reference image extending in the sub-scanning direction, while forming particular images at predetermined positions on the recording medium during the forward direction main scanning and reverse direction scanning of the recording head, the predetermined position being different from that of the reference image;

the image detection means or step may perform main scanning on the recording medium to detect the reference image and the particular images formed during the forward direction main scanning and reverse direction main scanning; and the data processing means or step may calculate the amount of offset based on the distance between the center position of the particular image formed during the forward direction main scanning and the center position of the reference image, and also based on the distance between the center position of the particular image formed during the reverse direction main scanning and the center position of the reference image.

Further, the image detection means or step may detect the quantity of reflected light resulting from irradiation of the recording medium with light, and may use a sensor for indicating a change in the quantity of reflected light depending on whether an image may be formed on the recording medium.

In the seventh aspect of the invention, there is provided a recording apparatus for forming a image by means of main scanning executed by a plurality of recording heads and sub-scanning as a relative moving operation between the recording heads and a recording medium in a direction different from the main scanning direction, comprising:

image formation means for forming predetermined images at predetermined positions on the recording medium by using the plurality of recording heads;

image detection means for scanning the recording medium to detect the predetermined images formed by the plurality of recording heads; and data processing means for determining a center position of the predetermined image in a scanning direction of the image detection means, from detection start and end positions of the predetermined image associated with scanning by the image detection means, and calculating the amount of offset between the recording positions of the predetermined images formed by the plurality of recording heads, based on the center positions of the predetermined images formed by the plurality of recording heads.

In the eighth aspect of the invention, there is provided a recording position correcting method with respect to a recording apparatus for forming a image by means of main scanning executed by a plurality of recording heads and sub-scanning as a relative moving operation between the recording heads and a recording medium in a direction different from the main scanning direction, the method comprising the steps of:

forming predetermined images at predetermined positions on the recording medium by using the plurality of recording heads;

detecting the predetermined images formed by the plurality of recording heads image, by using detection means being scanning on the recording medium; and determining a center position of the predetermined image in a scanning direction of the image detection means, from detection start and end positions of the predetermined image associated with scanning by the image detection means, and calculating the amount of offset between the recording positions of the predetermined images formed by the plurality of recording heads, based on the center positions of the predetermined images formed by the plurality of recording heads.

In any of the seventh and eighth aspects, the image formation means or step may form a reference image at a predetermined position on the recording medium during the forward or reverse direction main scanning of one of the recording heads, the reference image extending in the sub-scanning direction, while forming particular images at predetermined positions on the recording medium in the main scanning direction using each of the plurality of recording heads, the predetermined position being different from that of the reference image;

the image detection means or step may perform main scanning on the recording medium to detect the reference image and the particular images formed by the recording heads; and the data processing means or step may calculate the amount of offset based on the distance between the center position in the main scanning direction of each of the particular images formed by a corresponding one of the plurality of recording heads and the center position of the reference image in the main scanning direction.

Alternatively, the image formation means or step may form a reference image at a predetermined position on the recording medium during the forward or reverse direction main scanning of one of the recording heads, the reference image extending in the main scanning direction, while forming particular images at predetermined positions on the recording medium in the sub-scanning direction using each of the plurality of recording heads, the predetermined position being different from that of the reference image;

the image detection means or step may perform sub-scanning on the recording medium to detect the reference image and the particular images formed by the recording heads; and the data processing means or step may calculate the amount of offset based on the distance between the center position in the sub-scanning direction of each of the particular images formed by a corresponding one of the plurality of recording heads and the center position of the reference image in the sub-scanning direction.

In these, the image detection means or step may detect the quantity of reflected light resulting from irradiation of the recording medium with light, and may use a sensor for indicating a change in the quantity of reflected light depending on whether an image may be formed on the recording medium.

In the ninth aspect of the invention, there is provided a recording apparatus for forming an image by allowing one or more recording heads to relatively scan a recording medium, comprising:

image formation means for forming images at predetermined positions on the recording medium by means of a plurality of recording operations performed by the one or more recording heads;

image detection means for detecting the predetermined images formed by each of the plurality of recording operations, the image detection means having a sensor for detecting the quantity of reflected light resulting from irradiation of the recording medium with light and indicating a change in the quantity of reflected light depending on a rate at which an image may be present within the detection range; and data processing means for setting the sensor at an identical position in the scanning direction in a boundary portion of each of the predetermined images on the recording medium that are formed by each of the plurality of recording operations, in order to detect the quantity of light, and for calculating the amount of offset of the recording positions of the images obtained by the plurality of recording operations based on the difference in the detected amount of reflected light.

In the tenth aspect of the invention, there is provided a recording position correcting method with respect to a recording medium for forming an image by allowing one or more recording heads to relatively scan a recording medium, the method comprising the steps of:

forming images at predetermined positions on the recording medium by means of a plurality of recording operations performed by the one or more recording heads;

detecting the predetermined images formed by each of the plurality of recording operations, by using image detection means having a sensor for detecting the quantity of reflected light resulting from irradiation of the recording medium with light and indicating a change in the quantity of reflected light depending on a rate at which an image may be present within the detection range; and setting the sensor at an identical position in the scanning direction in a boundary portion of each of the predetermined images on the recording medium that are formed by each of the plurality of recording operations, in order to detect the quantity of light, and calculating the amount of offset of the recording positions of the images obtained by the plurality of recording operations based on the difference in the detected amount of reflected light.

In any of the ninth and tenth aspects, in the boundary portion between a portion of the recording medium with an image formed therein and a portion with no image formed therein, the data processing means or step may move the sensor between at least two positions having different rates at which an image may be present within the detection range, in order to calculate the amounts of offset of the recording positions of the images obtained by the plurality of recording operations, based on the quantities of reflected light at the two positions, the travel distance, and the difference.

The recording apparatus may form an image by means of main scanning as a reciprocating operation of a recording head and sub-scanning as a relative moving operation between the recording head and a recording medium in a direction different from the main scanning direction, the plurality of recording operations being performed in the forward direction main scanning and reverse direction main scanning, wherein;

the image formation means or step may form the predetermined images at a theoretical identical position in the main scanning direction during each of the forward direction main scanning and reverse direction main scanning of the recording head; and the data processing means or step may set the sensor at an identical position in the main scanning direction in the boundary portion of each of the predetermined images on the recording medium.

Alternatively, the recording apparatus may form an image by means of main scanning executed by a plurality of recording heads and sub-scanning as a relative moving operation between the recording heads and a recording medium in a direction different from the main scanning direction, the plurality of recording operations being performed by main scanning using the plurality of recording heads, wherein the image formation means or step may form the predetermined image at a theoretical identical position in the main scanning direction by means of each of the plurality of recording heads.

Alternatively, the recording apparatus may form an image by means of main scanning executed by a plurality of recording heads and sub-scanning as a relative moving operation between the recording heads and a recording medium in a direction different from the main scanning direction, the plurality of recording operations being performed by sub-scanning using the plurality of recording heads, wherein the image formation means or step may form the predetermined image at a theoretical identical position in the sub-scanning direction by means of each of the plurality of recording heads.

In any of the first to tenth aspects, there may be further provided means or step for correcting recording data or timings for recording an image on the recording medium, based on the amount of offset of the recording position determined by the data processing means or step.

The recording head may be a head for performing recording by ejecting ink.

Here, the recording head may have heating elements for generating thermal energy to make the ink to film-boil, as an energy used for ejecting the ink.

Incidentally, hereafter, the word "record" represents not only forming of significant information, such as characters, graphic image or the like but also represent to form image, patterns and the like on the printing medium irrespective whether it is significant or not and whether the formed image elicited to be visually perceptible or not, in broad sense, and further includes the case where the medium is processed.

Here, the wording "recording medium" represents not only paper to typically used in the printing apparatus but also cloth, plastic film, metal plate and the like and any substance which can accept the ink in broad sense.

Furthermore, the wording "ink" has to be understood in broad sense similarly to the definition of "print" and should include any liquid to be used for formation of image patterns and the like or for processing of the printing medium.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The present invention will be described below in detail with reference to the drawings.

(1) First Embodiment of Recording Position Corrections

Figure 1:
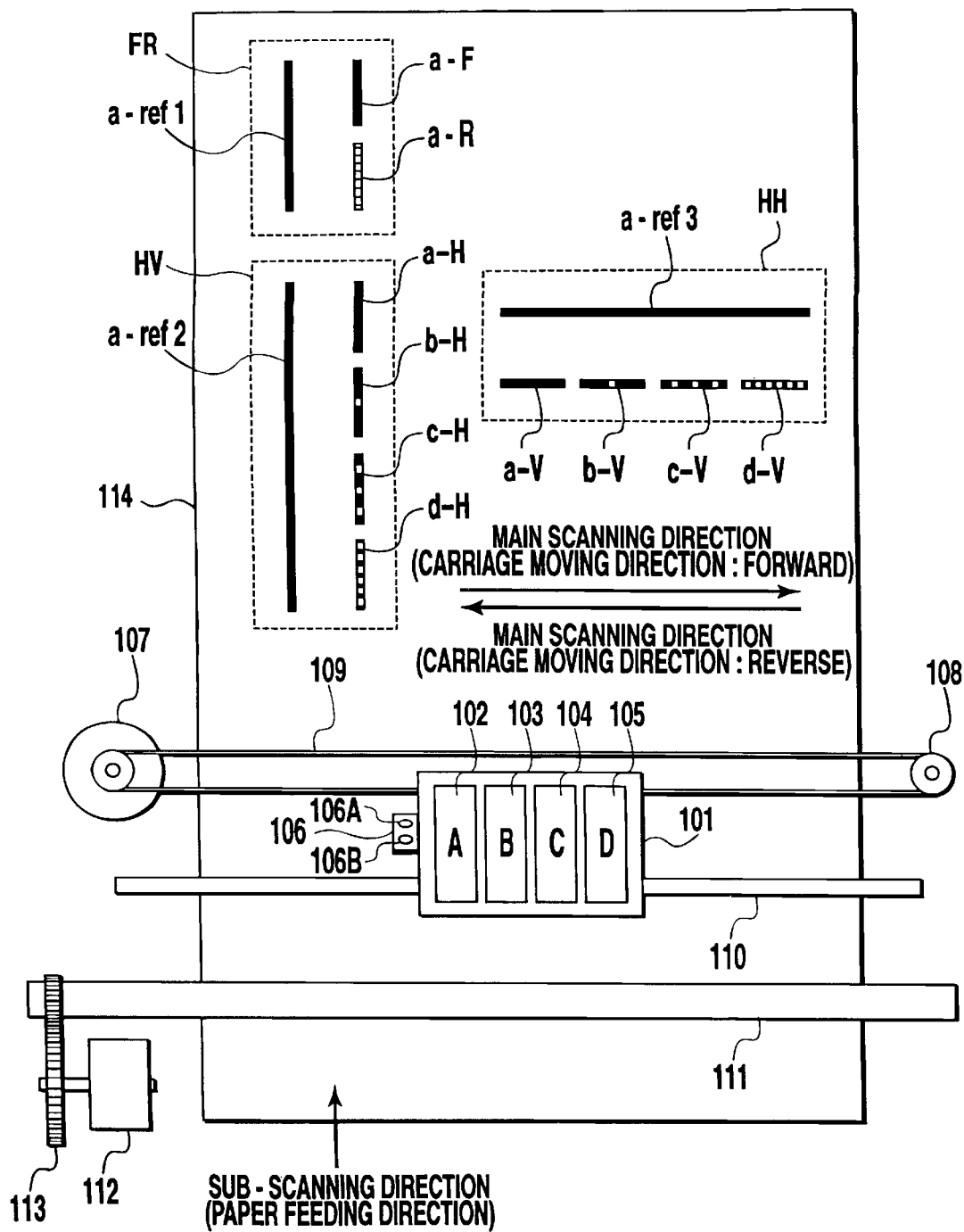
FIG. 1 is a schematic plan view of a serial-type ink jet recording apparatus used as a recording apparatus to which the present invention is applicable.

FIG. 1 shows an example of a configuration of a serial printer to which the present invention is applicable.

In FIG. 1, a reference numeral 101 denotes a carriage on which recording heads are mounted. A plurality of separate recording heads A, B, C, D, which are shown by reference numerals 102, 103, 104, 105, respectively, are mounted on this carriage 101. The plurality of recording heads correspond, for example, to inks of a plurality of colors (for example, black, yellow, magenta, and cyan) used to record color images.

The carriage 101 has a sensor 106 mounted thereon as means for detecting images recorded on a recording medium 114, and the sensor 106 performs detection operations while moving in a main scanning direction in response to the movement of the carriage. The sensor 106 may be comprised, for example, of a reflection-type optical sensor for measuring the amount of light having a light emitting section 106A for irradiating the recording medium with light and a light receiving section 106B for receiving reflected light with which the recording medium has been irradiated, and can read an image on the recording medium used for recording position correction based upon changing of reflected light quantity.

The carriage 101 with the recording heads A to D mounted thereon can be reciprocated in a lateral direction (the main scanning direction) of the drawing along a guide rail 110 by a belt 109 driven by a motor 107 and supported by a pulley 108. In addition, the recording medium 114 is transferred in a vertical direction (a sub-scanning direction) by a transfer roller 111 rotatably driven by a motor 112 via a transmission gear 113.

Although the example in FIG. 1 shows a form in which all the plurality of image recording heads are mounted on the single carriage 101, each recording head may be mounted on a corresponding one of a plurality of independent carriages. Alternatively, the head may have a form in which it is integrated with any two or more of the ejecting portions with ejection openings arranged therein for ejecting each color ink.

In addition, recording heads may correspond to a plurality of types of inks having the same color but different densities so that a plurality of recording heads can be provided so as to correspond to the different densities. Then, by appropriately replacing these heads with one another and mounting the selected heads on the carriage 101, the image formation operation can be switched between monochrome images and color images and between binary images and halftone images.

Groups FR, HV, and HH shown in FIG. 1 on the recording medium 114 and enclosed by broken lines contain images used for recording position corrections associated with reciprocating main scanning for bi-directional recording, recording in the main scanning direction using a plurality of heads, and recording in the sub-scanning direction using a plurality of heads. The illustrated recording image groups correspond to various recording modes. For example, however, a recording apparatus with a single head which does not require interhead corrections may carry out corrections for bi-directional recording alone. That is, a recording apparatus may only include a correction function corresponding to its recording mode.

A required one of the correction processes for recording misalignment described below can be executed with an appropriate timing, depending on the number and types of recording heads mounted on the carriage, or replacement of the recording head, or deterioration with age.

That is, these correction processes may all be carried out at a time or only one or more of the processes specified in accordance with a user's selection may be carried out. In addition, the processing can be activated by operating an activation switch provided on the printer body or issuing an instruction through an application in a host apparatus, or in consideration of deterioration with age, for example, in each section of the recording apparatus or in the head, management means such as a timer is used to activate or urge correction processing if no adjustments have been made over a long time. Alternatively, correction processing may be activated or urged if the recording head has been replaced.

The recording head has a form of a cartridge integrally having ink tanks that each accommodates an ink as a recording agent and that cannot be separated from the ejecting portion or can be removed therefrom so that the entire cartridge or the ink tank can be replaced when there remains no ink. Alternatively, inks may be supplied to the recording heads mounted on the carriage 101 via tubes or the like from the ink tanks provided in those sites of the apparatus that are separate from the carriage.

Furthermore, the ejecting portion can have an electrothermal converting element (an ejection heater), which subjects the ink to film boiling in response to conduction to generate heat energy used to eject the ink.

Figure 2:
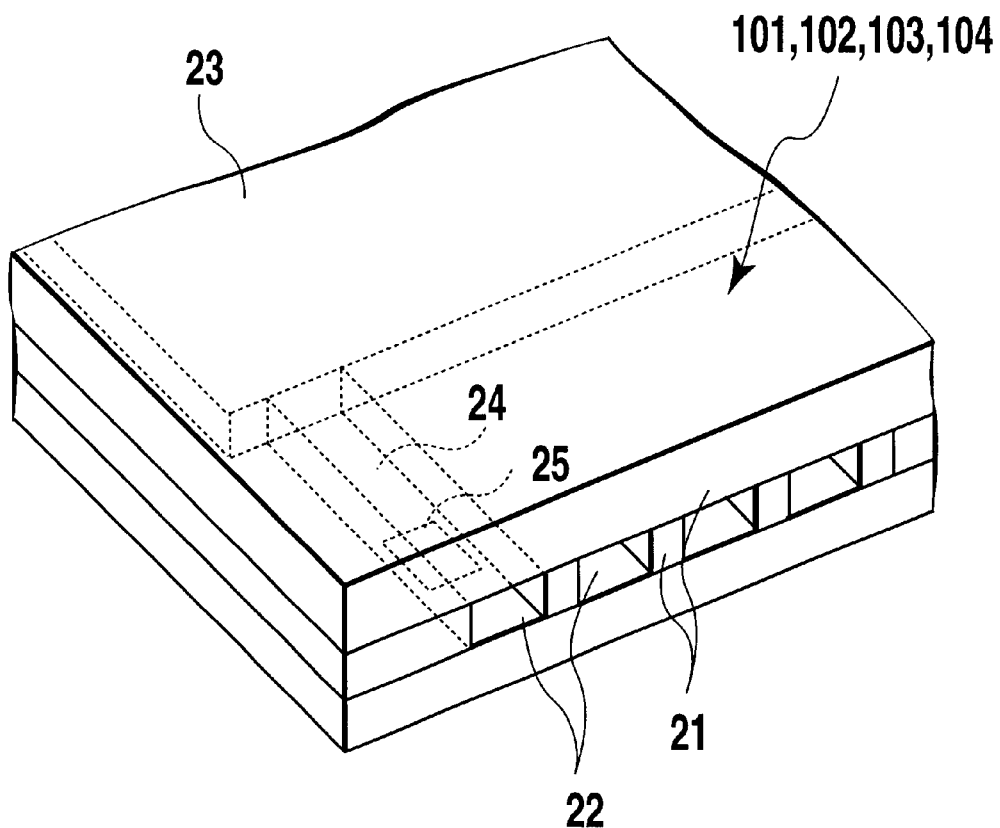
FIG. 2 is a perspective view schematically showing the structure of essential parts of a print head in the apparatus shown in FIG. 1.

FIG. 2 is a schematic perspective-view partially showing a structure of the ejecting portion of the recording head.

A plurality of ejection openings 22 are formed with the predetermined pitches on the head face 21 faced with the recording medium 114 spaced the predetermined clearance in FIG. 2, and along a wall surface of each liquid passages 24 communicating a common liquid chamber 23 with each ejection opening 22, the electrothermal converting elements (exothermic resistant element and so on) 25 for generating the energy used for ejecting ink ejection are arranged. In this embodiment, each of the recording heads is installed on the carriage 101 under the positional relationship so that the ejection openings 22 stand in a line in the direction which crosses a scanning direction of the carriage 101. Thus, the recording head is constituted in that the corresponding electrothermal converting elements 25 are driven (energized) based on the image signal or ejection signals and to film-boil ink within the liquid passages 24 and to eject the ink from the ejection openings 22 by pressure of the bubbles which are generated by film-boiling.

Figure 3:
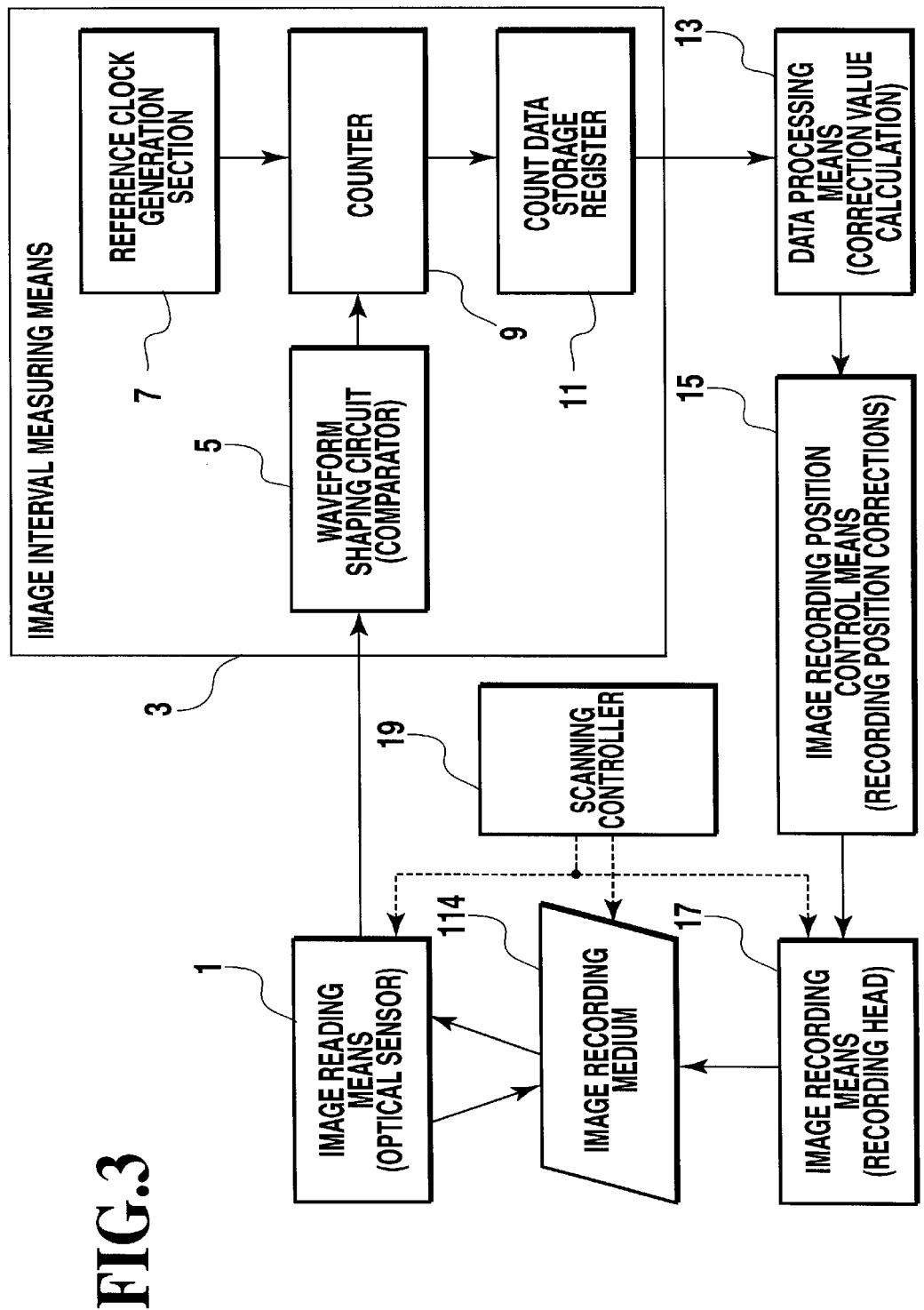
FIG. 3 is a block diagram showing those essential parts of a control system of the apparatus in FIG. 1 that implement a first embodiment of recording position corrections according to the present invention.

FIG. 3 is a block diagram showing an embodiment of a configuration of those essential parts of a control system of the serial printer shown in FIG. 1 that particularly implement the recording position correction processing described below.

In FIG. 3, an image reading portion 1 includes the above optical sensor 106 mounted on the carriage 101 for reading recorded image data used for the recording position correction processing. An image interval measuring portion 3 executes processing required to measure the interval between the recorded images used for the recording position correction processing, and has a circuit 5 including a comparator for shaping the waveform of output signals from the optical sensor 106, a circuit 7 for generating a reference clock, a counter 9 for counting sensor output signals the waveform of which has been shaped, based on the reference clock, and a register 11 for storing count values therein.

A data processing portion 13 calculates a correction value for correcting the recording position, based on the count values stored in the register 11. An image recording position controller 15.controls driving of an image recording portion 17 including the recording heads, based on the corrected value, in order to achieve recording without an offset.

A scanning controller 19 includes a motor 107 for moving the carriage 101 (main scanning), a driver for the motor 107, a motor 112 for transferring the recording medium (sub-scanning), and a driver for the motor 112 in order to appropriately control the carriage and the recording medium during normal recording operation, and to control them so as to carry out main scanning and/or sub-scanning at a specified speed while reading data on the recorded images used for recording position correction processing.

Incidentally, the control system in FIG. 3 may all be comprised of hardware, or some of the predetermined functions (such as the data processing portion 13) may be implemented by software of a CPU including in the recording apparatus.

(1.2) Recording Corrections Between Reciprocating Main-scanning Operations

Processing executed in the serial printer configured as shown in FIG. 1 for automatically correcting the image recording position in the main scanning direction and the sub-scanning direction will be described below with reference to FIGS. 3 and 4.

First, during main scanning in the forward direction executed by the recording head A, a reference image (shown by reference "a-ref1" in FIGS. 1 and 4) extending in the sub-scanning direction is formed at a predetermined position on the recording medium, for example, in this embodiment, near the left end of the recording medium. In addition, the same recording head A is used to form images a-F and a-R at predetermined positions on the recording medium 114 during main-scanning movements of the carriage in the forward and reverse directions, as shown in the upper parts of FIGS. 1 and 4, the images being linearly continuous in the recording medium feeding direction. The predetermined positions are theoretical ones at which the two images a-F and a-R are aligned in a sub-scanning direction, and essentially, without the offset of the recording position between the two directions, the distances in the main scanning direction between each of the two images and the reference image a-ref1 located to the left thereof are equal.

Subsequently, the recording medium 114 is transferred in a direction reverse to the recording medium feeding direction of this image recording process to return to the original recording start position. Next, the two images recorded during scanning in the forward or reverse direction are read using the optical sensor 106 provided on the carriage 101 for reading recorded images. In an actual reading operation, the recording medium 114 is transferred to a position at which both the reference image a-ref1 shown in the upper left of FIG. 4 which has been recorded by the recording head A and the recorded image a-F shown at the right of the image a-ref1 which has been recorded by the recording head A during forward direction scanning can be read during a single main scanning operation. Then, the recorded images are read by moving the carriage at a constant velocity V in the main-scanning forward direction (operation 1-1).

Next, the recording medium 114 is further transferred in the sub-scanning direction to a position at which both the reference image a-ref1 recorded by the recording head A and the recorded image a-R shown at the right thereof which has been recorded by the recording head A can be read during a single main scanning operation. Then, the recorded images are read by moving the carriage at the constant velocity V in the main-scanning forward direction, as described above (operation 1-2).

Figure 4:
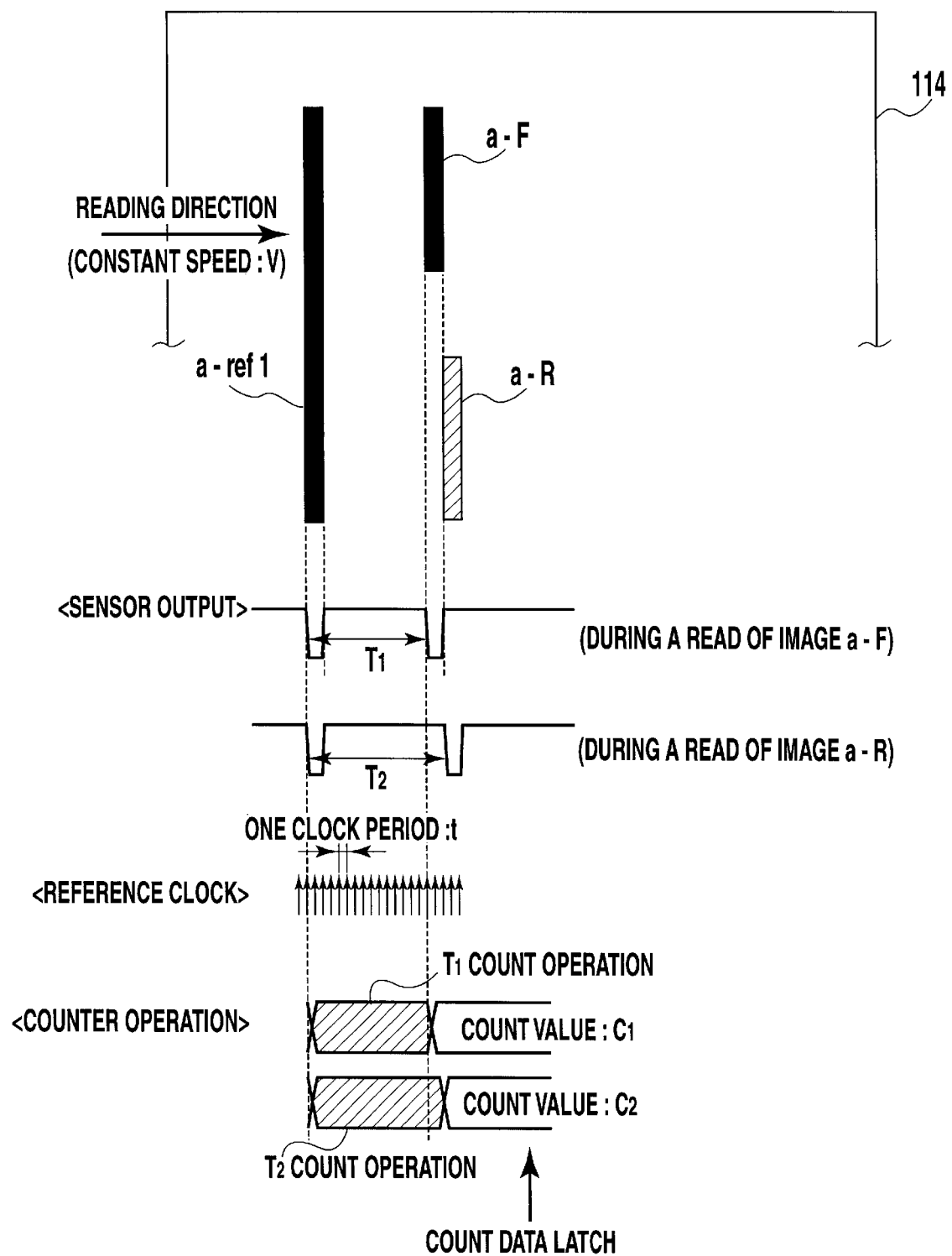
FIG. 4 is an explanatory drawing for describing correction processing between main scanning in a forward direction and main scanning in a reverse direction in the first embodiment of recording position corrections.

Outputs from the sensor 106 during the above image reading operations are shown in FIG. 4 almost in the middle thereof as <sensor output> waveforms and in FIG. 3 as output signals from the image reading portion 1. An output waveform from this sensor is shaped by the circuit 5 including the comparator, which is a component of the image interval measuring portion 3 shown in FIG. 3, and this waveform is then input to the counter 9. The counter 9 is comprised of a counter that is triggered by a rising edge of a signal from the waveform shaping circuit 5 and that counts up in accordance with a reference clock from the reference clock generation portion 7 until the next rising edge. These count values are loaded in the count data storage register 11 in the subsequent block each time the above reading operation is performed twice. FIG. 4 shows these operations in its lower part as the <reference clock> waveform and the <counter operation>.

Next, the data processing portion 13 in FIG. 3 calculates the amount of offset of the recording position between forward direction scanning and reverse direction scanning from the two count values loaded in the count data storage register 11. The amount of offset is calculated as follows:

If the following definitions are made:

velocity at which the carriage moves during image reading: V clock number count value obtained over a duration T1 in which the reference image a-ref1 and the recorded image a-F by the main-scanning in the forward direction are read (operation 1-1): C1, clock number count value obtained over a duration T2 in which the reference image a-ref1 and the recorded image a-R by the main-scanning in the reverse direction are read (operation 1-2): C2, and one clock period of the reference clock input to the counter: t, then the amount of offset of the bi-directional image recording position is determined by "(C1−C2)×t×V".

In addition, the resolution is defined by V×t, so it is 1 $\mu$m if, for example, V=0.5 m/s and t=2 $\mu$sec.

The amount of offset (a correction value) determined is supplied to the image recording position controller 15 shown in FIG. 3. Based on this amount of offset, the image recording position controller 15 then processes image data to be recorded and adjusts recording timings to control the subsequent image recording portion 17 so that the recording position will not be offset in the main scanning direction during bi-directional image recording, thereby enabling the bi-directional recording position to be automatically corrected.

(1.3) Corrections Among a Plurality of Heads for Main Scanning

Next, processing carried out in the serial printer configured as shown in FIG. 1 for automatically correcting the image recording positions of a plurality of recording heads in the main scanning direction will be described with reference to FIGS. 3 and 5.

Figure 5:
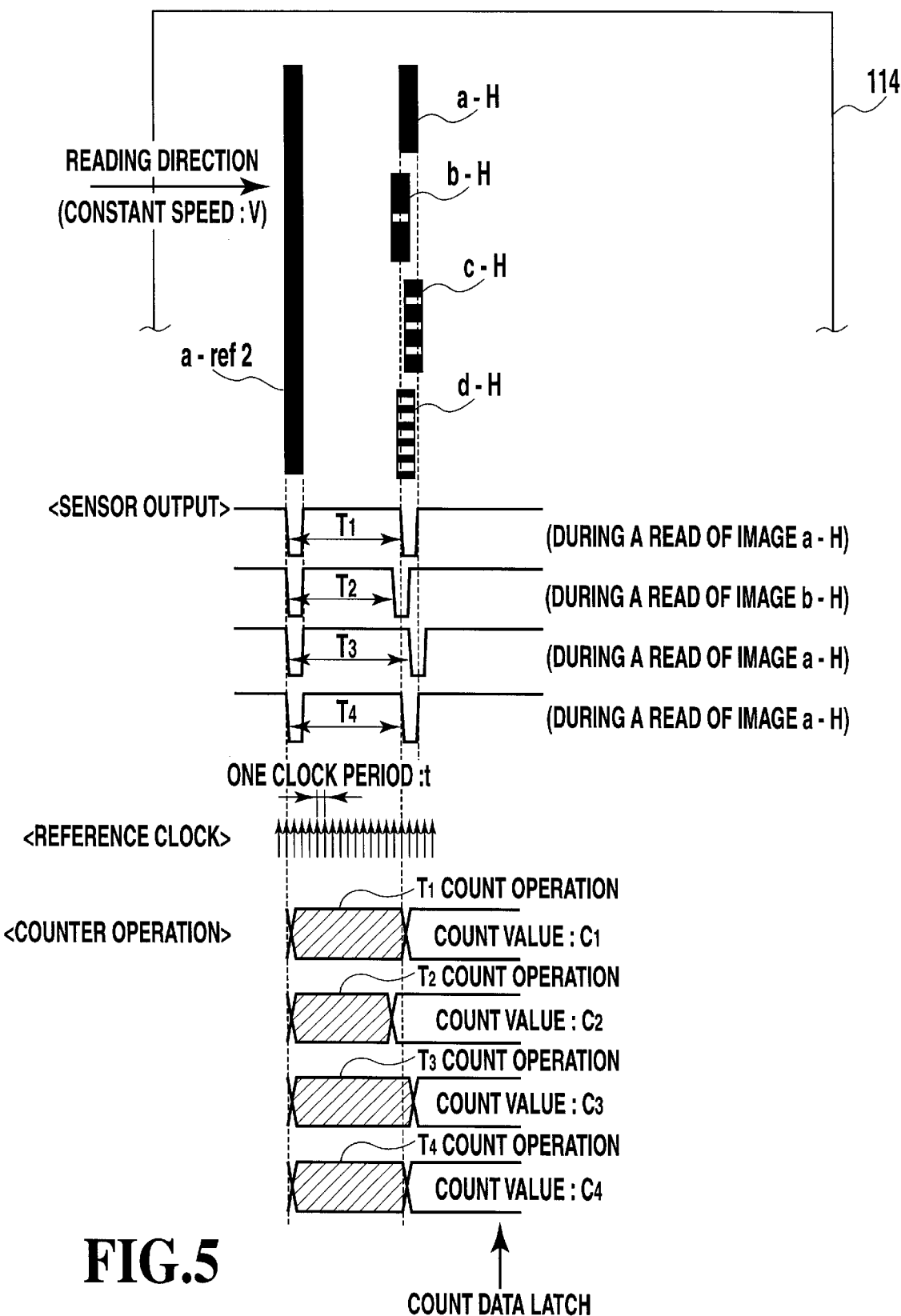
FIG. 5 is an explanatory drawing for describing correction processing for main scanning operations of a plurality of heads in the first embodiment of recording position corrections.

First, during main scanning in the forward or reverse direction executed by the recording head A, a reference image (shown by reference "a-ref2" in FIGS. 1 and 5) extending in the sub-scanning direction is formed at a predetermined position on the recording medium, for example, in FIG. 5, near the left end of the recording medium. In addition, the recording heads A, B, C, D are used to form images a-H, b-H, c-H, d-H at predetermined positions on the recording medium 114 only during main scanning in the forward or reverse direction, as shown in the upper part of FIG. 5, the images being linearly continuous in the recording medium feeding direction. The predetermined positions are theoretical ones at which the recorded image a-H recorded by the recording head A, the recorded image b-H recorded by the recording head B, the recorded image c-H recorded by the recording head C, and the recorded image d-H recorded by the recording head D, which are all shown in FIG. 5, are aligned in a sub-scanning direction, and essentially, without the offset of the recording position of each recording head from the theoretical position, the distances in the main scanning direction between each of these images and the reference image a-ref2 located to the left thereof are equal.

Subsequently, the recording medium 114 is transferred in the direction reverse to the recording medium feeding direction of this image recording process to return to the original recording start position. Next, the recorded images are read using the optical sensor 106 provided on the carriage 101 for reading recorded images. In an actual reading operation, the recording medium 114 is transferred to a position at which both the reference image a-ref2 shown in the upper left of FIG. 5 which has been recorded by the recording head A and the recorded image a-H shown at the right of the image a-ref2 which has been recorded by the recording head A can be read during a single main scanning operation. Then, the recorded images are read by moving the carriage at the constant velocity V in the main scanning forward direction (operation 2-1).

Next, the recording medium 114 is further transferred in the sub-scanning direction to a position at which both the reference image a-ref2 recorded by the recording head A and the recorded image b-H shown at the right thereof which has been recorded by the recording head B can be read during a single main scanning operation. Then, the recorded images are read by moving the carriage 101 at the constant velocity V in the main-scanning forward direction, as described above (operation 2-2).

Then, the recording medium 114 is further transferred in the sub-scanning direction to a position at which both the reference image a-ref2 recorded by the recording head A and the recorded image c-H shown at the right thereof which has been recorded by the recording head C can be read during a single main scanning operation. Then, the recorded images are read by moving the carriage 101 at the constant velocity V in the main-scanning forward direction, as described above (operation 2-3).

Next, the recording medium 114 is further transferred in the sub-scanning direction to a position at which both the reference image a-ref2 recorded by the recording head A and the recorded image d-H shown at the right thereof which has been recorded by the recording head D can be read during a single main scanning operation. Then, the recorded images are read by moving the carriage 101 at the constant velocity V in the main-scanning forward direction, as described above (operation 2-4).

Outputs from the sensor 106 during the above image reading operations are shown in FIG. 5 almost in the middle thereof as <sensor output> waveforms and in FIG. 3 as output signals from the image reading portion 1. An output waveform from this sensor is shaped by the circuit 5 including the comparator, which is a component of the image interval measuring portion 3 shown in FIG. 3, and this waveform is then input to the counter 9. The counter 9 is triggered by a rising edge of a signal from the waveform shaping circuit 5 and counts up each time a reading operation of (operation 2-1) to (operation 2-4) is performed, until the next rising edge. These count values are loaded in the count data storage register 11 in the subsequent block each time the above reading operation is performed twice. FIG. 5 shows these operations in its lower part as the <reference clock> waveform and the <counter operation>.

Next, the data processing portion 13 in FIG. 3 calculates the amount of offset of the main-scanning recording position among the plurality of heads, from the each two count values loaded in the count data storage register 11. The amount of offset is calculated as follows:

If the following definitions are made:

velocity at which the carriage moves during image reading: V clock number count value obtained over a duration T1 in which the reference image a-ref2 recorded by the recording head A and the recorded image a-H recorded by the recording head A are read (operation 2-1): C1, clock number count value obtained over a duration T2 in which the reference image a-ref2 recorded by the recording head A and the recorded image b-H recorded by the recording head B are read (operation 2-2): C2, clock number count value obtained over a duration T3 in which the reference image a-ref2 recorded by the recording head A and the recorded image c-H recorded by the recording head C are read (operation 2-3): C3, clock number count value obtained over a duration T4 in which the reference image a-ref2 recorded by the recording head A and the recorded image d-H recorded by the recording head D are read (operation 2-4): C4, and one clock period of the reference clock input to the counter: t, then the amount of offset of the main-scanning direction recording position for each head is determined by "(C1−Cn)×t×V" (n=2, 3, 4), that is, by the amounts of offset of the recording positions of the other heads observed if the recording head A is used as a reference.

The amount of offset (a correction value) determined is passed to the image recording position controller 15 shown in FIG. 3. Based on this amount of offset, the image recording position controller 15 then processes image data to be recorded for each recording head and adjusts recording timings for each recording head to control the subsequent image recording portion 17 so that the recording position on the recording medium for each recording head will not be offset in the main scanning direction, thereby enabling the recording position in the main scanning direction to be automatically corrected among the plurality of recording heads.

The example in FIG. 5 is preferably applicable to the correction of the main-scanning-direction recording position among a plurality of recording heads, and for bi-directional recording, this example can be combined, for example, with the above example to record images without offset in both directions for the plurality of recording heads.

(1.4) Corrections Among a Plurality of Heads for Sub-scanning

Next, processing carried out in the serial printer configured as shown in FIG. 1 for automatically correcting the image recording positions of a plurality of recording heads in the sub-scanning direction will be described with reference to FIGS. 3 and 6.

Figure 6:
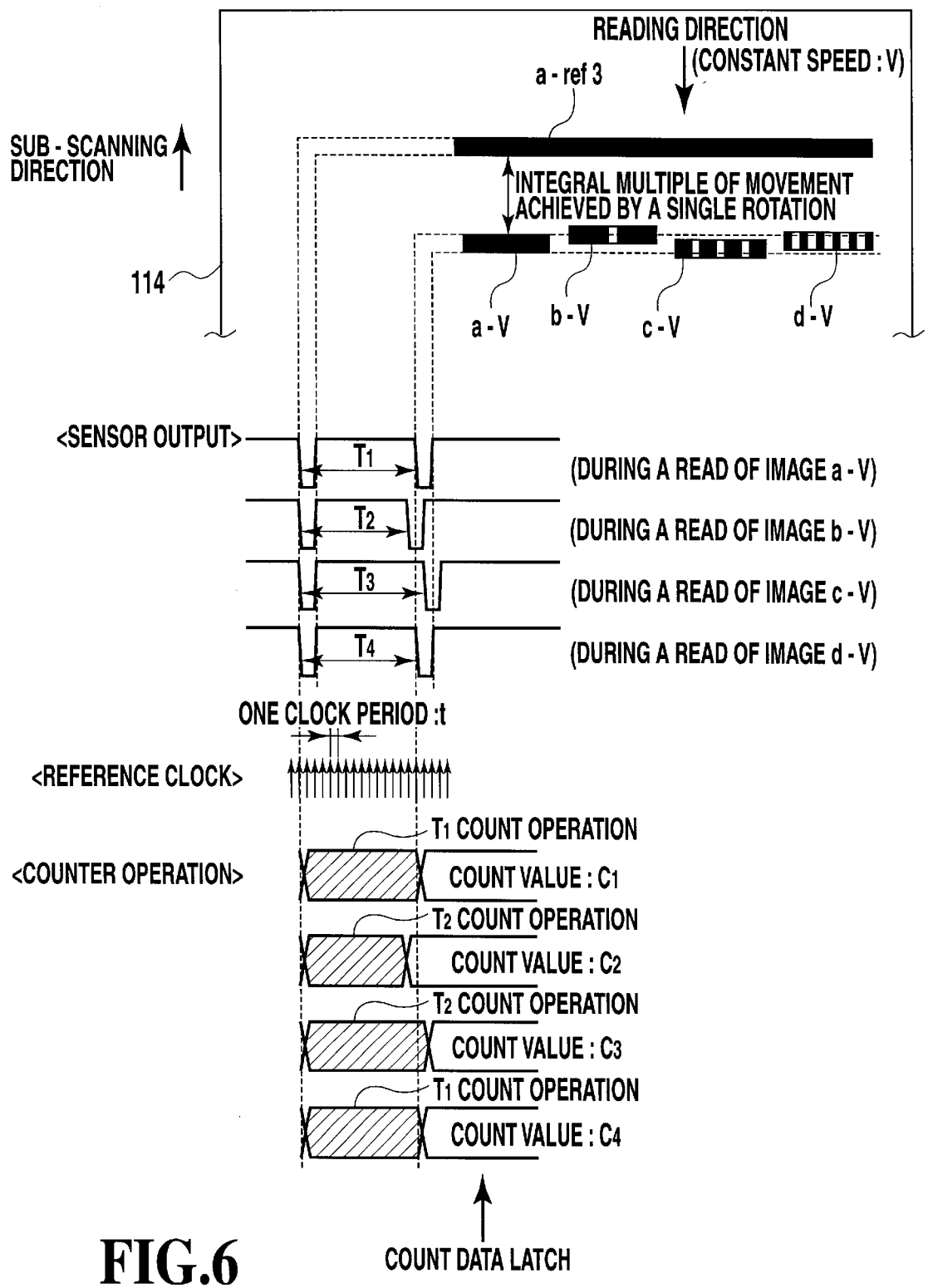
FIG. 6 is an explanatory drawing for describing correction processing for sub-scanning operations of a plurality of heads in the first embodiment of recording position corrections.

First, during main scanning operation in the forward or reverse direction executed by the recording head A, a reference image (shown by reference "a-ref3" in FIGS. 1 and 6) extending in the main scanning direction is formed at a predetermined position on the recording medium, for example, in FIG. 6, near the upper end of the recording medium. In addition, the recording heads A, B, C, D are used to carry out main scanning in the forward and reverse directions in order to simultaneously form images a-V, b-V, c-V, d-V at predetermined positions on the recording medium 114, as shown in the upper part of FIG. 6, the images being linearly continuous in the carriage movement direction. The predetermined positions are theoretical ones at which the recorded image a-V recorded by the recording head A, the recorded image b-V recorded by the recording head B, the recorded image c-V recorded by the recording head C, and the recorded image d-V recorded by the recording head D, which are all shown in FIG. 6, are aligned in a main scanning direction, and essentially, without the offset of the recording position of each recording head from the theoretical position, the distances in the sub-scanning direction between each of these images and the reference image a-ref3 located to the left thereof are equal.

In addition, the variation of the accuracy with which the recording medium is fed within a single rotation of the motor can be absorbed by using as a reference the position of a motor shaft that is a sub-scanning drive source for starting recording the reference image a-ref3 by means of the recording head A and subsequently starting image recording by each head from a position reached by the recording medium after a transfer by an amount corresponding to an integral multiple of one rotation of the motor 112.

Subsequently, the recording medium 114 is transferred in the direction reverse to the recording medium feeding direction of this image recording process to return to the original recording start position. Next, the recorded images are read using the optical sensor 106 provided on the carriage 101 for reading recorded images. In an actual reading operation, the recording medium 114 is transferred to a position at which both the reference image a-ref3 shown in the upper left of FIG. 6 which has been recorded by the recording head A and the recorded image a-V shown below the image a-ref2 which has been recorded by the recording head A can be read during a single sub-scanning operation. Then, the recorded images are read by feeding the recording medium 114 at the constant velocity V in the sub-scanning direction (operation 3-1).

Next, the recording medium 114 is again transferred in the reverse direction to a position at which both the reference image a-ref3 recorded by the recording head A and the recorded image b-V shown therebelow which has been recorded by the recording head B can be read during a single sub-scanning operation. Then, the recorded images are read by feeding the recording medium 114 at the constant velocity V, as described above (operation 3-2).

Then, the recording medium 114 is again transferred in the reverse direction to a position at which both the reference image a-ref3 recorded by the recording head A and the recorded image c-V which has been recorded by the recording head C can be read during a single sub-scanning operation. Then, the recorded images are read by feeding the recording medium 114 at the constant velocity V, as described above (operation 3-3).

Next, the recording medium 114 is again transferred in the reverse direction to a position at which both the reference image a-ref3 recorded by the recording head A and the recorded image d-V which has been recorded by the recording head D can be read during a single sub-scanning operation. Then, the recorded images are read by feeding the recording medium 114 at the constant velocity V, as described above (operation 3-4).

Outputs from the sensor 106 during the above image reading operations are shown in FIG. 6 almost in the middle thereof as <sensor output> waveforms and in FIG. 3 as output signals from the image reading portion 1. An output waveform from this sensor is shaped by the circuit 5 including the comparator, which is a component of the image interval measuring portion 3 shown in FIG. 3, and this waveform is then input to the counter 9. The counter 9 is triggered by a rising edge of a signal from the waveform shaping circuit 5 and counts up each time a reading operation of (operation 3-1) to (operation 3-4) is performed, until the next rising edge. These count values are loaded in the count data storage register 11 in the subsequent block each time the above reading operation is performed twice. FIG. 5 shows these operations in its lower part as the <reference clock> waveform and the <counter operation>.

Next, the data processing portion 13 in FIG. 3 calculates the amount of offset of the recording position in the forward and reverse directions from the two count values loaded in the count data storage register 11. The amount of offset is calculated as follows:

If the following definitions are made:

velocity at which the carriage moves during image reading: V clock number count value obtained over a duration T1 in which the reference image a-ref3 recorded by the recording head A and the recorded image a-V recorded by the recording head A are read (operation 3-1): C1, clock number count value obtained over a duration T2 in which the reference image a-ref3 recorded by the recording head A and the recorded image b-V recorded by the recording head B are read (operation 3-2): C2, clock number count value obtained over a duration T3 in which the reference image a-ref3 recorded by the recording head A and the recorded image c-V recorded by the recording head C are read (operation 3-3): C3, clock number count value obtained over a duration T4 in which the reference image a-ref2 recorded by the recording head A and the recorded image d-V recorded by the recording head D are read (operation 3-4): C4, and one clock period of the reference clock input to the counter: t, then the amount of offset of the sub-scanning direction recording position for each head is determined by "(C1−Cn)×t×V" (n =2, 3, 4), that is, by the amounts of offset of the recording positions for the other heads observed if the recording head A is used as a reference.

The amount of offset (a correction value) determined is passed to the image recording position controller 15 shown in FIG. 3. Based on this amount of offset, the image recording position controller 15 then processes data on the recorded images for each recording head and adjusts recording elements for use during recording, for each recording head to control the subsequent image recording portion so that the recording position on the recording medium for each recording head will not be offset in the sub-scanning direction, thereby enabling the recording position in the sub-scanning direction to be automatically corrected. For example, in order to correct the recording position in the sub-scanning direction, the recording position can be corrected in terms of ejection opening intervals by forming ink ejection openings in each recording head (an ejecting portion) over a range larger than the maximum sub-scanning-direction width (a band width) of an image that can be formed during a single main scan and shifting a range of ejection openings for use.

This embodiment, which has been described above, can directly carry out corrections based on the interval (the amount of offset) between the images recorded by each of the recording operations for which the recording position is to be corrected, thereby improving the correction accuracy compared to indirect determination of a correction amount from carriage operations as in the prior art. That is, there is no need to dispose a sensor such as an encoder for measuring an amount of movement of the carriage and therefore, the correction accuracy is free from the ability of this sensor. In addition, the sensor 106 and/or the recording medium 114 are operated at the specified scanning speed in detecting the recorded images, thereby improving the reading accuracy. Furthermore, since the reference clock used to measure the image interval is also used as a clock for defining recording timings, the construction of the apparatus is simplified and the correction value obtained by means of measurements can be directly used to correct recording timings without the needs for complicated conversions. These effects are also applicable to the second example.

Each of the reference images a-ref1 and a-ref2 used for the recording position correction processing associated with forward and reverse main scanning for bi-directional recording and main-scanning direction recording using a plurality of heads may be formed by a single main scanning operation of the recording head A (images having a band width almost equal to the range of the array of ejection openings) or by a plurality of main scanning operations (image having a band width larger than the range of the array of ejection openings). In addition, particularly in the former case, images for which the amount of offset is determined relative to the reference image may be formed using a group of ejection openings constituting part of the range of the array of ejection openings in the recording head. Further, images used for the recording position correction processing may have an appropriate width in the main scanning direction depending on the accuracy with which the sensor reads images.

In addition, images used for the recording position correction processing for sub-scanning direction recording using a plurality of heads may be formed using a group of ejection openings constituting part of the range of the array of ejection openings in the recording head and may have an appropriate width in the sub-scanning direction depending on the accuracy with which the sensor reads images.

The contents of the above two paragraphs are applicable to the following embodiments.

(2) Second Example of Recording Position Corrections

A second embodiment of recording position corrections can also use an apparatus configuration and a head configuration similar to those in the first embodiment (shown in FIGS. 1 and 2, respectively).

Figure 7:
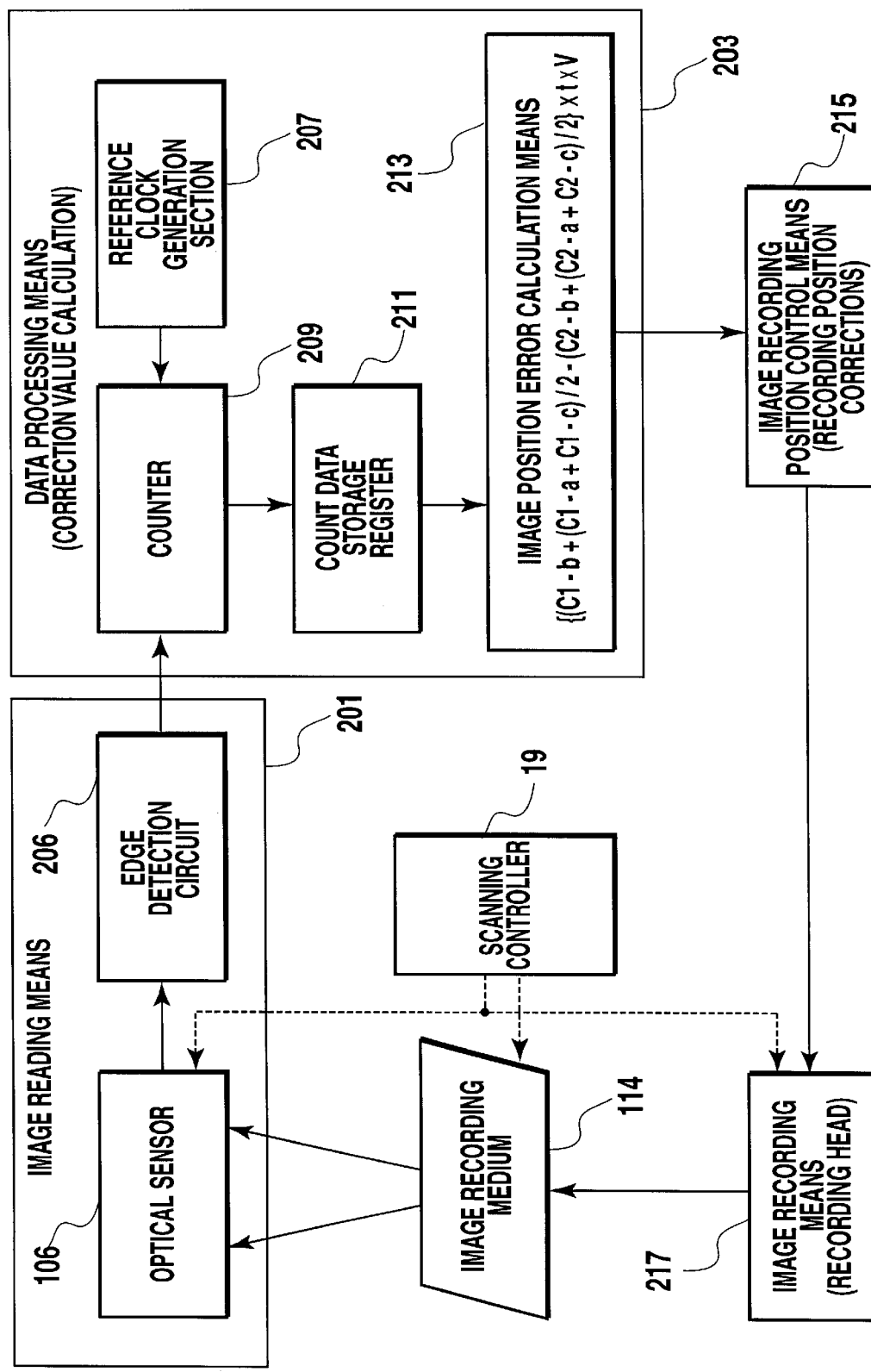
FIG. 7 is a block diagram showing those essential parts of the control system of the apparatus in FIG. 1 that implement a second embodiment of recording position corrections according to the present invention.

FIG. 7 is a block diagram showing an example of a configuration of those essential parts of a control section of the serial printer shown in FIG. 1 that executes recording position correction processing according to the present invention, which will be described below. Those components in FIG. 7 that can be constructed as in FIG. 3 for the first embodiment have the same reference numerals at the corresponding portions.

In FIG. 7, image reading portion 201 includes the above optical sensor 106 mounted on the carriage 101 for reading recorded image data used for recording position correction processing, and has a circuit 206 for detecting falling and rising edges in outputs from the sensor 106. Data processing portion 203 calculates the data used for recording position correction processing and has a circuit 207 for generating a reference clock, a counter 209 for counting sensor output signals based on the reference clock, a register 211 for storing the count values, and arithmetic portion 213 for calculating a correction value for recording position corrections based on the stored count values. Based on this correction value, image recording position control portion 215 controls driving of image recording portion 217 including the recording heads to enable recording without offset.

Incidentally, the control system in FIG. 7 may all be comprised of hardware, or some of the predetermined functions (such as the arithmetic portion 213) may be implemented using software of a CPU including in the recording apparatus.

(2.1) Recording Corrections Between Reciprocating Main-scanning Operations

Processing according to this embodiment which is executed in the serial printer configured as shown in FIG. 1 for automatically correcting the image recording position in the main scanning direction and the sub-scanning direction will be described below with reference to FIGS. 7 and 8.

First, during main scanning in the forward direction executed by the recording head A, a reference image (shown by reference "a-ref1" in FIG. 8) extending in the sub-scanning direction is formed at a predetermined position on the recording medium, for example, in this embodiment, near the left end of the recording medium. In addition, the same recording head A is used to form images a-F and a-R at predetermined positions on the recording medium 114 during main-scanning movements of the carriage in the forward and reverse directions, as shown in the upper part of FIG. 8, the images being linearly continuous in the recording medium feeding direction. The predetermined positions are theoretical ones at which the two images a-F and a-R are aligned in a sub-scanning direction, and essentially, without the offset of the recording position between the two directions, the distances in the main scanning direction between each of the two images and the reference image a-ref1 located to the left thereof are equal.

Subsequently, the recording medium 114 is transferred in a direction reverse to the recording medium feeding direction of this image recording process to return to the original recording start position. Next, the two images recorded during scanning in the forward or reverse direction are read using the optical sensor 106 provided on the carriage 101 for reading recorded images. In an actual reading operation, the recording medium 114 is transferred to a position at which both the reference image a-ref1 shown in the upper left of FIG. 8 which has been recorded by the recording head A and the recorded image a-F shown at the right of the image a-ref1 which has been recorded by the recording head A during forward direction scanning can be read during a single main scanning operation. Then, the recorded images are read by moving the carriage at the constant velocity V in the main scanning forward direction.

Next, the recording medium 114 is further transferred in the sub-scanning direction to a position at which both the reference image a-ref1 recorded by the recording head A and the recorded image a-R shown to the right thereof which has been recorded by the recording head A can be read during a single main scanning operation. Then, the recorded images are read by moving the carriage 101 at the constant velocity V in the main-scanning forward direction, as described above.

Figure 8:
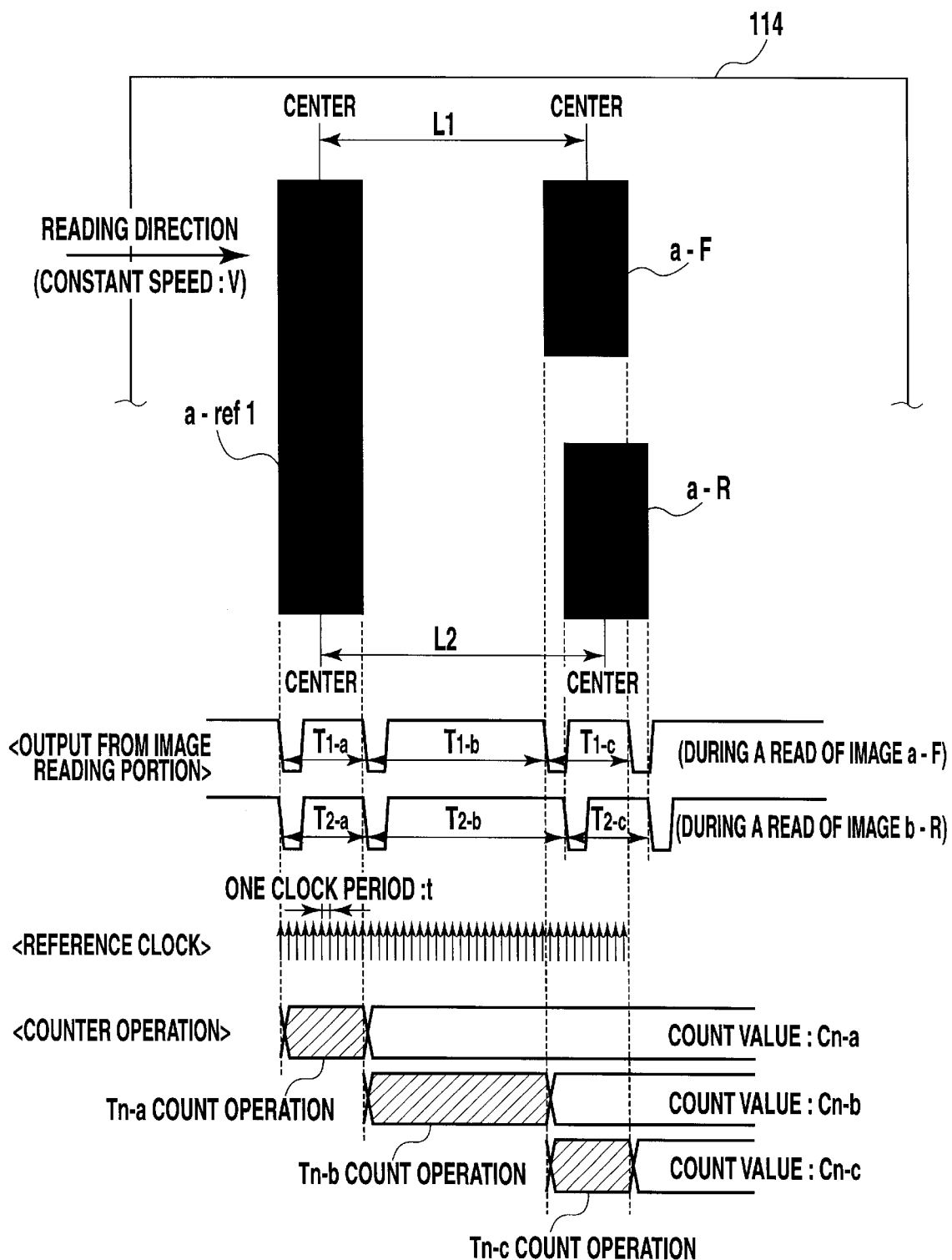
FIG. 8 is an explanatory drawing for describing correction processing between main scanning in a forward direction and main scanning in a reverse direction in the second embodiment of recording position corrections.

Outputs from the image reading portion 201 during the above image reading operation are shown in FIG. 8 almost in the middle thereof as <image reading portion output> waveforms. The image reading portion 201 outputs a low pulse immediately after both the start and end of image detection.

This output waveform is input to the counter 209, which is a component of the data processing portion 203 shown in FIG. 7. The counter 209 is triggered by a falling edge of a signal from the image reading portion 201 and counts up in accordance with a reference clock from the reference clock generation portion 207 during $T_{n-a}$, $T_{n-b}$, and $T_{n-c}$ (n=1, 2, ...), which are shown in FIG. 8. These count values are loaded in the count data storage register 211 in the subsequent block each time the above reading operation is performed twice. FIG. 8 shows these operations in its lower part as the <reference clock> waveform and the <counter operation>.

Next, the arithmetic portion 213 in FIG. 7 calculates the amount of offset of the recording position between forward direction scanning and reverse direction scanning, from the two count values loaded in the count data storage register 211. The amount of offset is calculated as follows:

If the following definitions are made:

velocity at which the carriage moves during image reading: V and one clock period of the reference clock input to the counter: t, then a clock count value obtained when the reference image a-ref1 and the image a-F recorded by the main scanning in the forward direction are read: $C_{1-a}$, $C_{1-b}$, $C_{1-c}$, a clock count value obtained when the reference image a-ref1 and the image a-R recorded by the main-scanning in the reverse direction are read: $C_{2-a}$, $C_{2-b}$, $C_{2-c}$, the center-to-center distance in the main-scanning direction between the reference image a-ref1 and the image a-R recorded by the main- scanning in the forward direction: $\{C_{1-b}+(C_{1-a}+C_{1-c})/2\}\times t\times V$, and the center-to-center distance in the main-scanning direction between the reference image a-ref1 and the image a-F recorded by the main- scanning in the reverse direction: $\{C_{2-b}+(C_{2-a}+C_{2-c})/2\}\times t\times V$. Therefore, the amount of offset of the image recording position between bi-directional recordings is determined by "$[\{C_{1-b}+C_{1-a}+C_{1-c})/2\}-\{(C_{2-b}+C_{2-a}+C_{2-c})/2\}]\times t\times V$".

In addition, the resolution is defined by V×t, so it is 1 $\mu$m if, for example, V=0.5 m/s and t=2 $\mu$sec.

The amount of offset (a correction value) determined is supplied to the image recording position control portion 215 shown in FIG. 7. Based on this amount of offset, the image recording position control portion 215 then processes image data to be recorded and adjusts recording timings to control the subsequent image recording portion 217 so that the recording position will not be offset in the main scanning direction during bi-directional image recording, thereby enabling the bi-directional recording position to be automatically corrected.

(2.2) Corrections Among a Plurality of Heads for Main Scanning

Next, processing according to this embodiment which is carried out in the serial printer configured as shown in FIG. 1 for automatically correcting the image recording positions of a plurality of recording heads in the main scanning direction will be described with reference to FIGS. 7 and 9.

Figure 9:
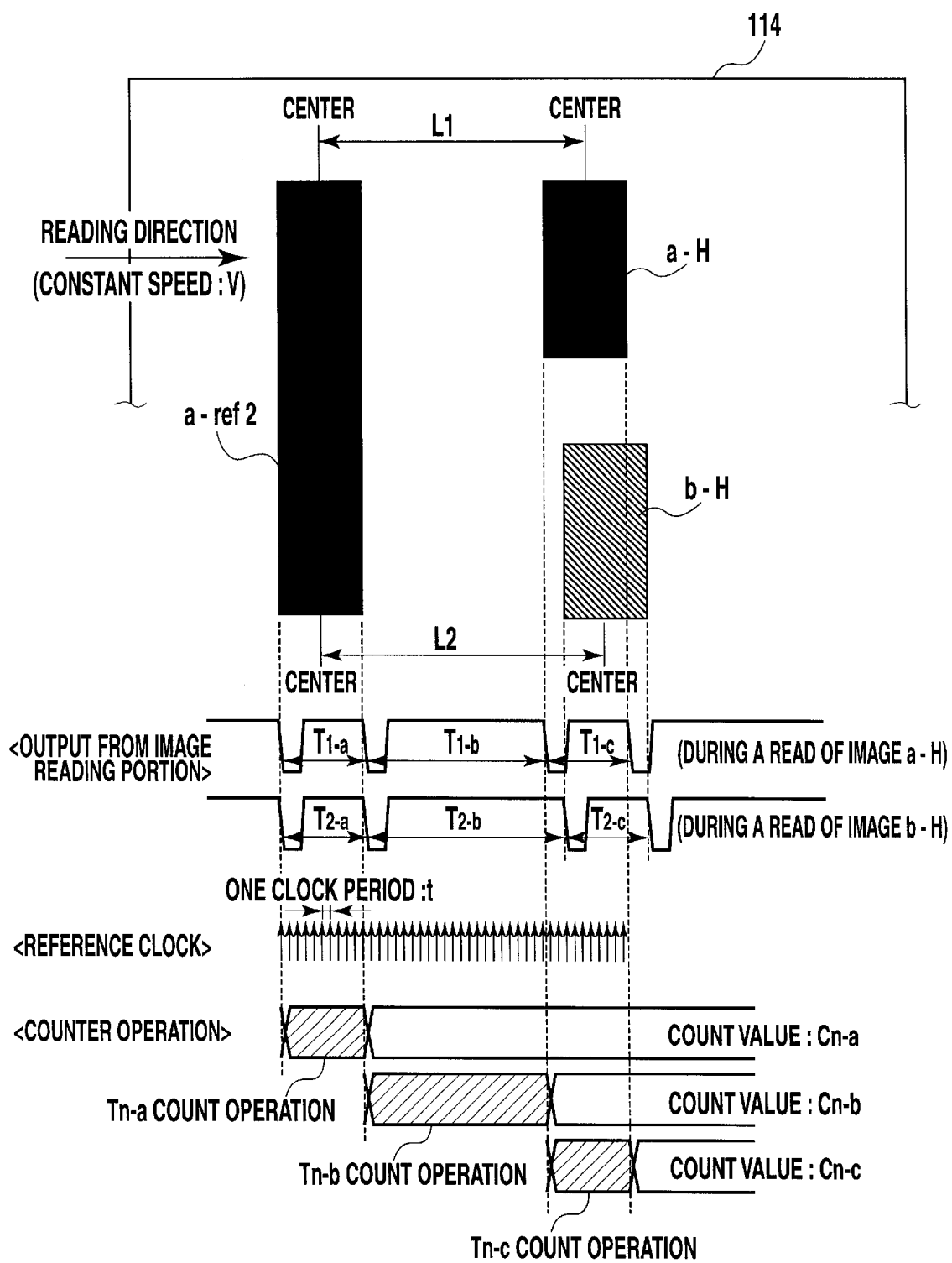
FIG. 9 is an explanatory drawing for describing correction processing for main scanning operations of a plurality of heads in the second embodiment of recording position corrections.

First, during main scanning in the forward or reverse direction executed by the recording head A, a reference image (shown by reference "a-ref2" in FIGS. 1 and 9) extending in the sub-scanning direction is formed at a predetermined position on the recording medium, for example, in FIG. 9, near the left end of the recording medium. In addition, the recording heads A, B, C, D are used to form images a-H, b-H, c-H, d-H at predetermined positions on the recording medium 114 only during main scanning in the forward or reverse direction, the images being linearly continuous in the recording medium feeding direction (for-simplicity, only the recorded images a-H and b-H are shown in FIG. 9). The predetermined positions are theoretical ones at which the recorded image a-H recorded by the recording head A, the recorded image b-H recorded by the recording head B, the recorded image c-H recorded by the recording head C, and the recorded image d-H recorded by the recording head D are aligned in a sub-scanning direction, and essentially, without the offset of the recording position of each recording head from the theoretical position, the distances in the main scanning direction between each of these images and the reference image a-ref2 located to the left thereof are equal.

Subsequently, the recording medium 114 is transferred in the direction reverse to the recording medium feeding direction of this image recording process to return to the original recording start position. Next, the recorded images are read using the optical sensor 106 provided on the carriage 101 for reading recorded images. In an actual reading operation, the recording medium 114 is transferred to a position at which both the reference image a-ref2 shown in the upper left of FIG. 5 which has been recorded by the recording head A and the recorded image a-H shown to the right of the image a-ref2 which has been recorded by the recording head A can be read during a single main scanning operation. Then, the recorded images are read by moving the carriage at the constant velocity V in the main scanning forward direction.

Next, the recording medium 114 is further transferred in the sub-scanning direction to a position at which both the reference image a-ref2 recorded by the recording head A and the recorded image b-H shown at the right thereof which has been recorded by the recording head B can be read during a single main scanning operation. Then, the recorded images are read by moving the carriage 101 at the constant velocity V in the main-scanning forward direction, as described above. Subsequently, similar reading is carried out for each of the recording heads C and D.

Outputs from the image reading portion 201 during the above image reading operation are shown in FIG. 9 almost in the middle thereof as <image reading portion output> waveforms. The image reading portion 201 outputs a low pulse immediately after both the start and end of image detection.

This output waveform is input to the counter 209, which is a component of the data processing portion 203 shown in FIG. 7. The counter 209 is triggered by a falling edge of a signal from the image reading portion 201 and counts up in accordance with a reference clock from the reference clock generation portion 207 during $T_{n-a}$, $T_{n-b}$, and $T_{n-c}$ (n=1, 2, . . . ), which are shown in FIG. 9. These count values are loaded in the count data storage register 211 in the subsequent block every four reading operations for the heads A to D. FIG. 9 shows these operations in its lower part as the <reference clock> waveform and the <counter operation>.

Next, the arithmetic portion 213 in FIG. 7 calculates the amount of offset of the recording position among the plurality of heads, from the values loaded in the count data storage register 211. The amount of offset is calculated as shown below. Although the calculation is shown only for the recording heads A and B, it is also applicable to the recording heads C and D.

If the following definitions are made:
velocity at which the carriage moves during image reading: V and
one clock period of the reference clock input to the counter: t,
then a clock count value obtained when the reference image a-ref2 and the image a-H recorded by the recording head A: $C_{1-a}$, $C_{1-b}$, $C_{1-c}$,
a clock count value obtained when the reference image a-ref2 and the image b-H recorded by the recording head B: $C_{2-a}$, $C_{2-b}$, $C_{2-c}$
the center-to-center distance in the main-scanning direction between the reference image a-ref2 and the image a-H recorded by the recording head A: $\{C_{1-b}+(C_{1-a}+C_{1-c})/2\} \times t \times V$, and
the center-to-center distance in the main-scanning direction between the reference image a-ref2 and the image b-H recorded by the recording head B: $\{C_{2-b}+(C_{2-a}+C_{2-c})/2\} \times t \times V$. Therefore, the amount of offset of the recording position between the recording heads A and B is determined by "$[\{C_{1-b}+(C_{1-a}+C_{1-c})/2\}-\{C_{2-b}+(C_{2-a}+C_{2-c})/2\}] \times t \times V$".

In addition, the resolution is defined by V×t, so it is 1 μm if, for example, V=0.5 m/s and t=2 μsec.

The amount of offset (a correction value) determined is supplied to the image recording position control portion 215 shown in FIG. 7. Based on this amount of offset, the image recording position control portion 215 then processes image data to be recorded and adjusts recording timings to control the subsequent image recording portion 217 so that the recording position on the recording medium for each recording head will not be offset in the main scanning direction, thereby enabling the recording position in the main scanning direction to be automatically corrected among the plurality of recording heads.

Incidentally, FIG. 9 shows a method preferably applicable to the correction of the main-scanning direction recording position among the plurality of recording heads, and for bi-directional recording, this method can be combined, for example, with the above method to achieve image recording without offset in both directions for the plurality of recording heads.

(2.3) Corrections Among a Plurality of Heads for Sub-scanning

Next, processing according to this embodiment which is carried out in the serial printer configured as shown in FIG. 1 for automatically correcting the image recording positions of a plurality of recording heads in the sub-scanning direction will be described with reference to FIGS. 7 and 10.

Figure 10:
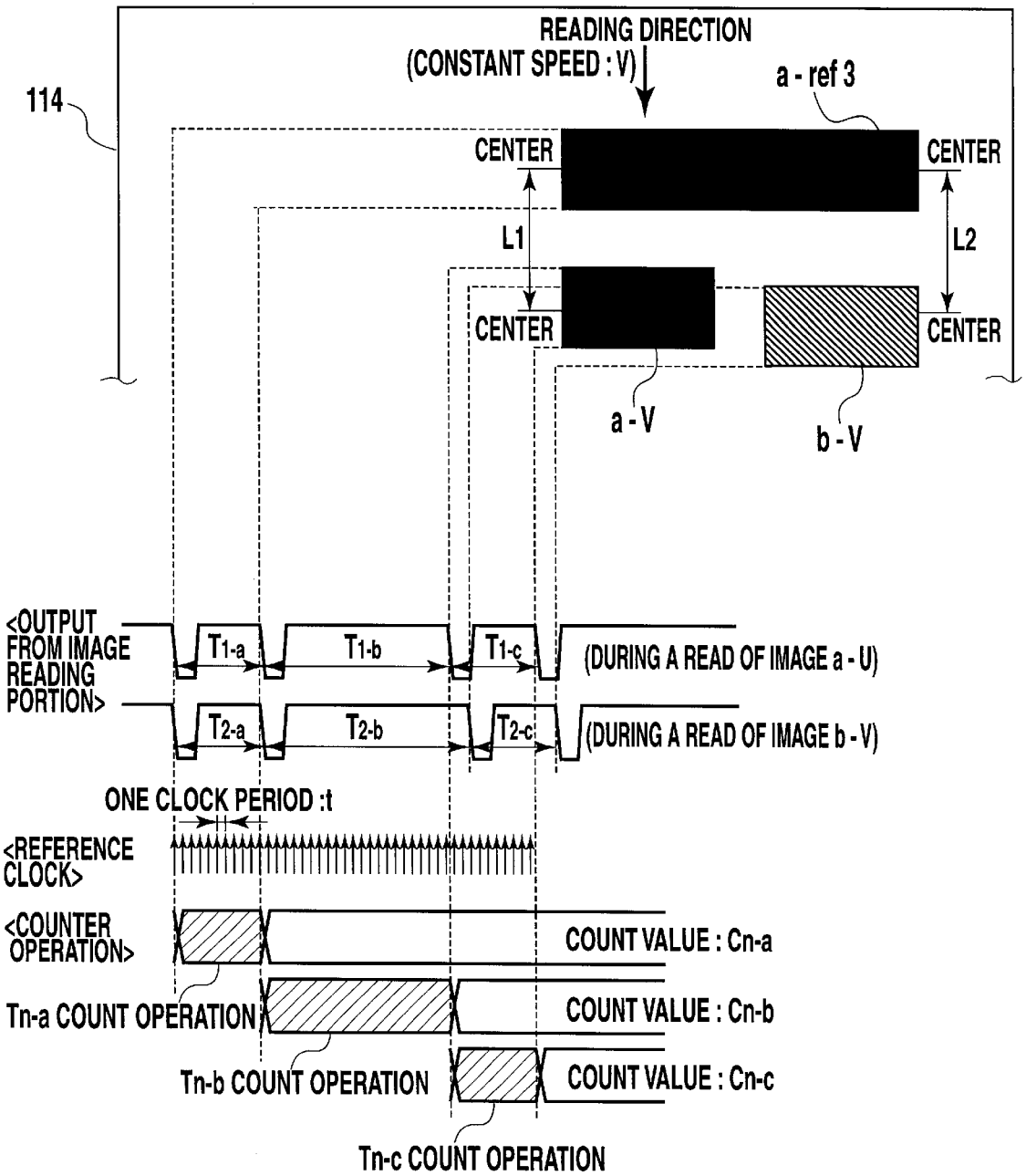
FIG. 10 is an explanatory drawing for describing correction processing for sub-scanning operations of a plurality of heads in the second embodiment of recording position corrections.

First, during main scanning operation in the forward or reverse direction executed by the recording head A, a reference image (shown by reference "a-ref3" in FIGS. 1 and 10) extending in the main direction is formed at a predetermined position on the recording medium, for example, in FIG. 10, near the upper end of the recording medium. In addition, the recording heads A, B, C, D are used to carry out main scanning in the forward and reverse directions in order to simultaneously form images a-V, b-V, c-V, d-V at predetermined positions on the recording medium 114, the images being linearly continuous in the carriage movement direction (for simplicity, only the recorded images a-V and b-V are shown in FIG. 10). The predetermined positions are theoretical ones at which the recorded image a-V recorded by the recording head A, the recorded image b-V recorded by the recording head B, the recorded image c-V recorded by the recording head C, and the recorded image d-V recorded by the recording head D, which are all shown in FIG. 1, are aligned in a main scanning direction, and essentially, without the offset of the recording position of each recording head from the theoretical position, the distances in the main scanning direction between each of these images and the reference image a-ref3 located to the left thereof are equal.

In addition, the variation of the accuracy with which the recording medium is fed within a single rotation of the motor can be absorbed by using as a reference the position of a motor shaft that is a sub-scanning drive source for starting recording the reference image a-ref3 by means of the recording head A, and subsequently starting image recording by each head from a position reached by the recording medium after a transfer by an amount corresponding to an integral multiple of one rotation of the motor 112.

Subsequently, the recording medium 114 is transferred in the direction reverse to the recording medium feeding direction of this image recording process to return to the original recording start position. Next, the recorded images are read using the optical sensor 106 provided on the carriage 101 for reading recorded images. In an actual reading operation, the recording medium 114 is transferred to a position at which both the reference image a-ref3 shown in the upper left of FIG. 6 which has been recorded by the recording head A and the recorded image a-V shown below the image a-ref2 which has been recorded by the recording head A can be read during a single sub-scanning operation. Then, the recorded images are read by feeding the recording medium 114 at the constant velocity V in the sub-scanning direction.

Next, the recording medium 114 is again transferred in the reverse direction to a position at which both the reference image a-ref3 recorded by the recording head A and the recorded image b-V shown therebelow which has been recorded by the recording head B can be read during a single sub-scanning operation. Then, the recorded images are read by feeding the recording medium 114 at the constant velocity V, as described above. Subsequently, similar reading is carried out for the recording heads C and D.

Outputs from the image reading portion 201 during the above image reading operation are shown in FIG. 10 almost in the middle thereof as <image reading portion output> waveforms. The image reading portion 201 outputs a low pulse immediately after both the start and end of image detection.

This output waveform is input to the counter 209, which is a component of the data processing portion 203 shown in FIG. 7. The counter 209 is triggered by a falling edge of a signal from the image reading portion 201 and counts up in accordance with a reference clock from the reference clock generation portion 207 during $T_{n-a}$, $T_{n-b}$, and $T_{n-c}$ (n=1, 2, ...), which are shown in FIG. 10. These count values are loaded in the count data storage register 211 in the subsequent block every four reading operations for the heads A to D. FIG. 10 shows these operations in its lower part as the <reference clock> waveform and the <counter operation>.

Next, the arithmetic portion 213 in FIG. 7 calculates the amount of offset of the recording position among the plurality of heads, from the count values loaded in the count data storage register 211. The amount of offset is calculated as shown below. Although the calculation is shown only for the recording heads A and B, it is also applicable to the recording heads C and D.

If the following definitions are made:
velocity at which the carriage moves during image reading: V and one clock period of the reference clock input to the counter: t, then a clock count value obtained when the reference image a-ref3 and the image a-V recorded by the recording head A: $C_{1-a}$, $C_{1-b}$, $C_{1-c}$, a clock count value obtained when the reference image a-ref3 and the image b-V recorded by the recording head B: $C_{2-a}$, $C_{2-b}$, $C_{2-c}$ the center-to-center distance in the sub-scanning direction between the reference image a-ref3 and the image a-V recorded by the recording head A: $\{(C_{1-b}+(C_{1-a}+C_{1-c})/2\} \times t \times V$, and the center-to-center distance in the sub-scanning direction between the reference image a-ref3 and the image b-V recorded by the recording head B: $\{C_{2-b}+(C_{2-a}+C_{2-c})/2\} \times t \times V$. Therefore, the amount of offset of the recording position between the recording heads A and B in the sub-scanning direction is determined by "$[\{C_{1-b}+(C_{1-a}+C_{1-c})/2\}-\{C_{2-b}+$ The amount of offset (a correction value) determined is passed to the image recording position control portion 215 shown in FIG. 7. Based on this amount of offset, the image recording position control portion 215 then processes data on the recorded images for each recording head and adjusts recording elements for use during recording, for each recording head to control the subsequent image recording portion so that the recording position on the recording medium for each recording head will not be offset in the sub-scanning direction, thereby enabling the recording position in the sub-scanning direction to be automatically corrected. For example, in order to correct the recording position in the sub-scanning direction, the recording position can be corrected in terms of ejection opening intervals by forming ink ejection openings in each recording head (an ejecting portion) over a range larger than the maximum sub-scanning-direction width (a band width) of an image that can be formed during a single main scan and shifting a range of ejection openings for use.

(3) Third Example of Recording Position Corrections

Figure 11:
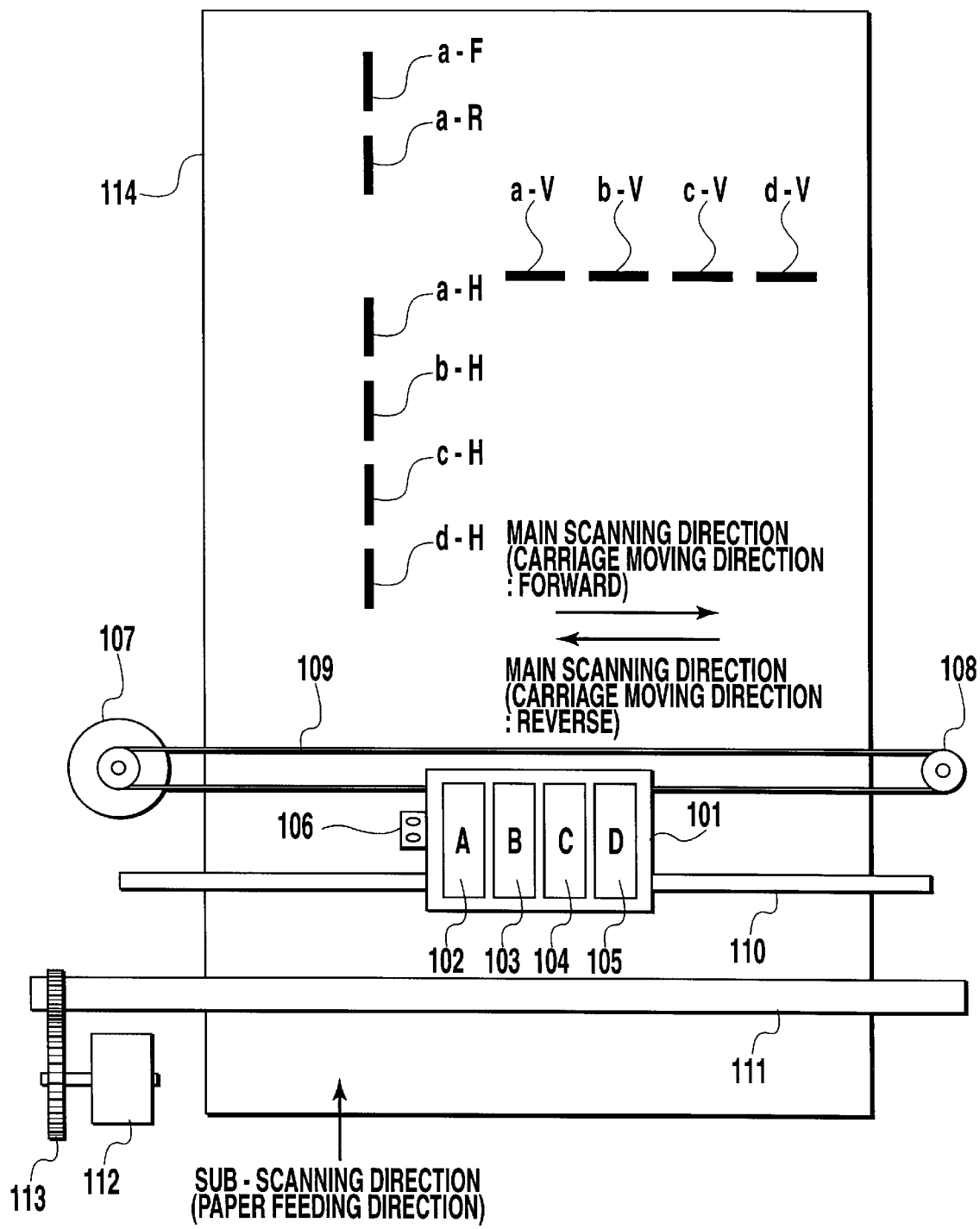
FIG. 11 is a schematic drawing showing a recording apparatus according to a third embodiment of recording position corrections and formation patterns of images for recording position corrections.

FIG. 11 shows a recording apparatus according to a third embodiment of recording position corrections and a formation pattern of images for recording position corrections. This embodiment also uses an apparatus configuration and a head configuration similar to those in the first embodiment (shown in FIGS. 1 and 2, respectively). This embodiment, however, uses a different formation pattern of images for recording position corrections and does not form a reference image such as ones in the first and second embodiments.

Figure 12:
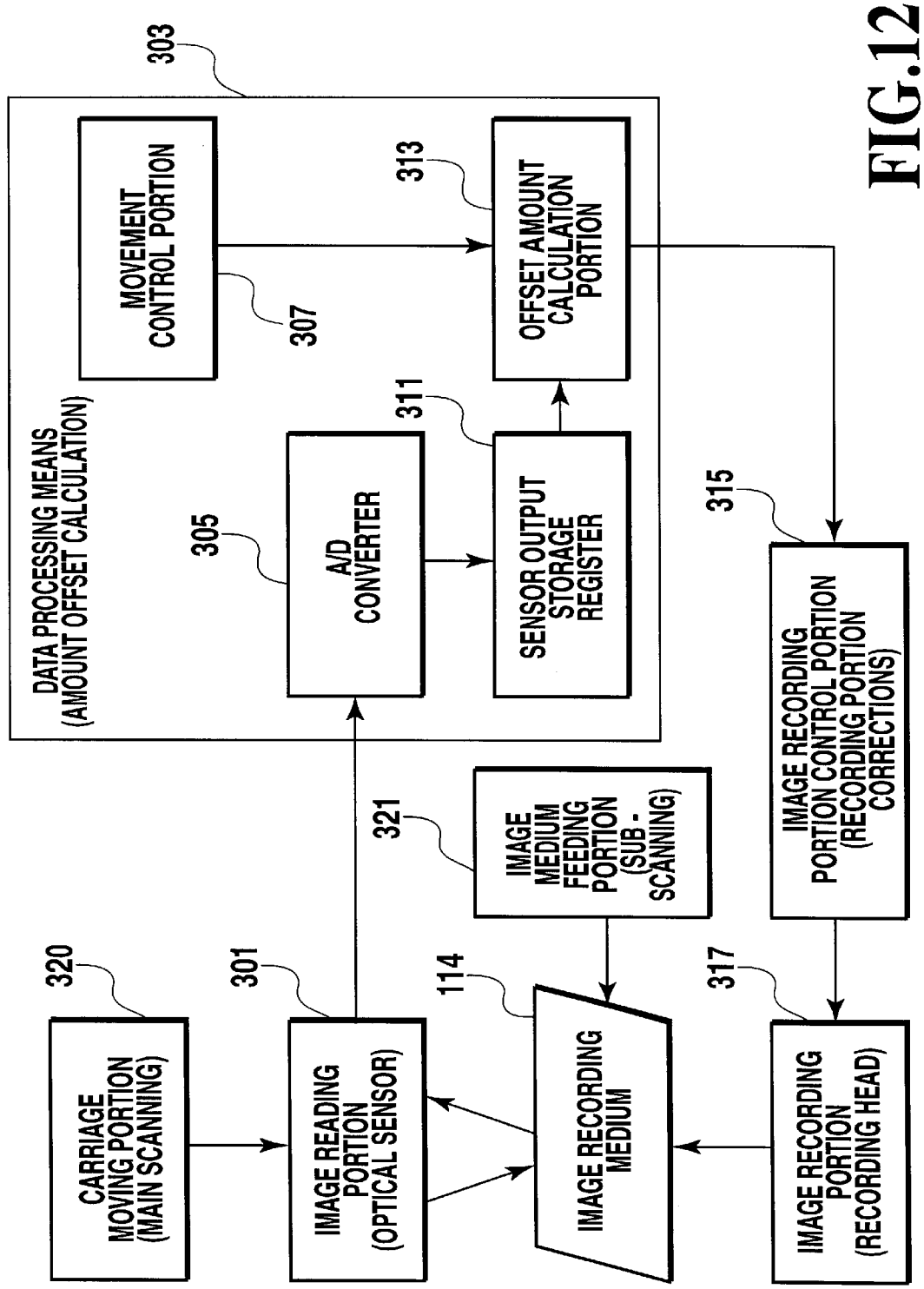
FIG. 12 is a block diagram showing essential parts of the control system of the apparatus in FIG. 11

FIG. 12 is a block diagram showing an example of a configuration of those essential parts of the control section of the serial printer shown in FIG. 11 that execute processing according to the present embodiment. Those components in FIG. 12 that can be constructed as in FIG. 3 for the first embodiment have the same reference numerals at the corresponding positions.

In FIG. 12, image reading portion 301 includes the above optical sensor 106 mounted on the carriage 101 for reading recorded image data used for recording position correction processing. Data processing portion 303 calculates the data used for recording position correction processing and has an A/D converter 305 for converting an analog output from the optical sensor 106 into a digital signal, a register 311 for storing data on this digital amount, and a calculation portion 313 for calculating the amount of offset of the recording position based on the stored value. Based on a correction value corresponding to this amount of offset, image recording position control portion 315 controls driving of image recording portion 317 including the recording heads to enable recording without offset.

In addition, a movement control portion 307 of the data processing portion 303 controls the movement of a carriage moving portion 320 including a motor 107 for moving the carriage 101 in the main scanning direction and the movement of a recording medium transfer portion 321 including a motor 112 for transferring the recording medium 114 in the sub-scanning direction.

Incidentally, the control system in FIG. 12 may all be comprised of hardware, or some of the predetermined functions (such as the calculation portion 313 and the movement control portion 307) may be implemented using software of a CPU including in the recording apparatus.

First, images for recording position corrections will be described with reference to FIGS. 11 and 12.

The carriage moving portion 320 and recording medium transfer portion 321 in FIG. 11 are driven to allow the image recording portion 317 to form image patterns such as one shown in FIG. 11 on the recording medium 114, the image patterns being used to detect the amounts of offsets in reciprocating main-scanning recording for bi-directional recording and among a plurality of heads during main-scanning direction recording and sub-scanning direction recording.

Specifically, to detect or correct the amount of offset of the bi-directional recording position during reciprocating scanning, the recording head A is used to form images a-F and a-R at predetermined positions on the recording medium 114 during main-scanning movements of the carriage in the forward and reverse directions, as shown in the upper part of FIG. 11, the images being linearly continuous in the recording medium feeding direction. The predetermined positions are theoretical ones at which the two images a-F and a-R are aligned in a sub-scanning direction, and essentially, without the offset of the recording position between the two directions, the two images are located at an equal distance from a certain point in the main scanning direction.

In addition, to detect and correct the amount of offset among the recording heads A, B, C and D in the main scanning direction, the recording heads A, B, C and D are used to form images a-H, b-H, c-H and d-H at predetermined positions on the recording medium 114, the images being linearly continuous in the recording medium feeding direction. Likewise, to detect and correct the amount of offset among the recording heads A, B, C and D in the sub-scanning direction, the recording heads A, B, C and D are used to form images a-V, b-V, c-V and d-V at predetermined positions on the recording medium 114, the images being linearly continuous in the carriage movement direction.

These recorded images are read by moving the sensor 106 relative to the images. This embodiment determines a sensor output change amount $\Delta V$ per unit distance in a direction for which the amount of misalignment of the image is to be determined.

Figure 13:
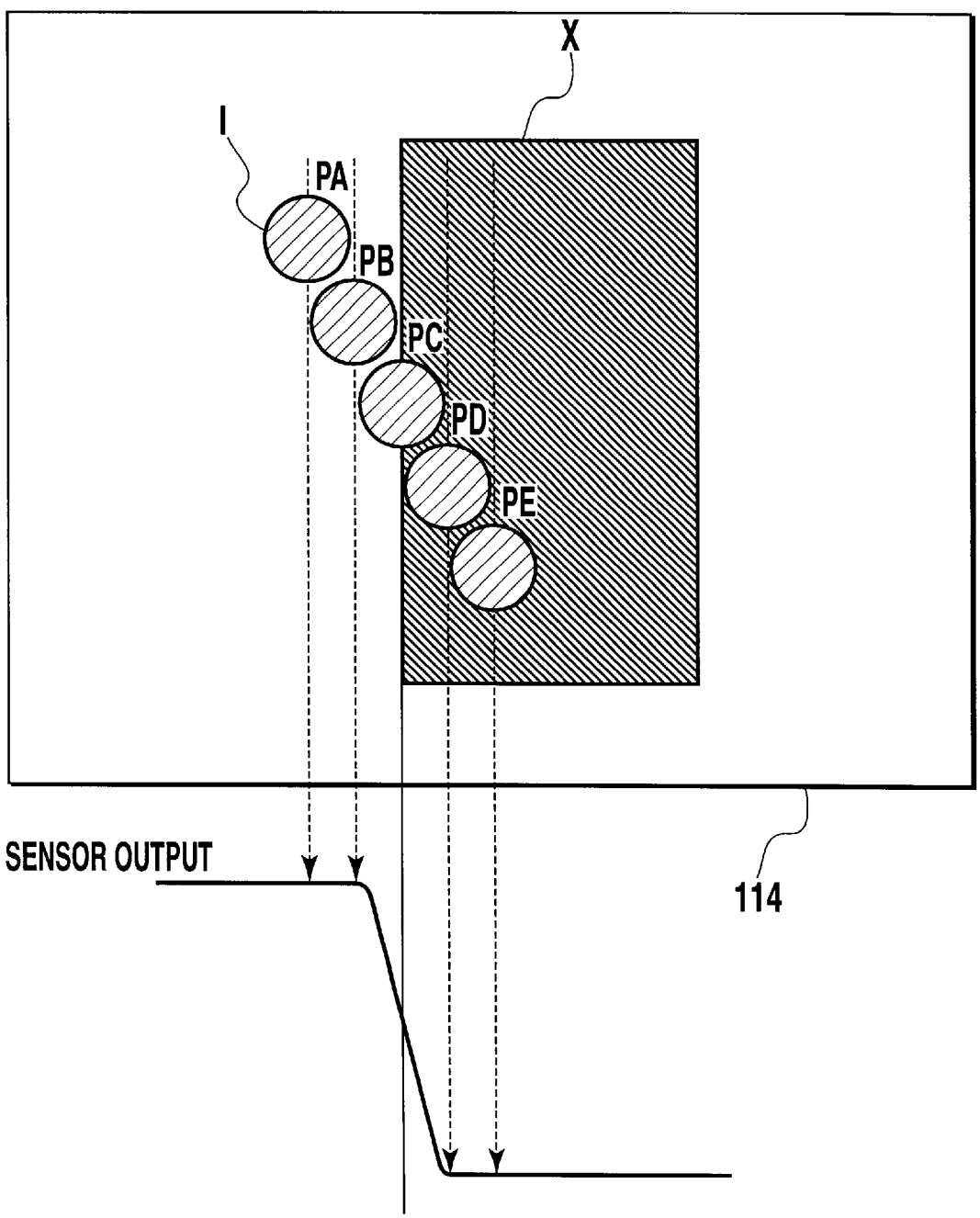
FIG. 13 is an explanatory drawing for describing the relationship between light fluxes and outputs of a sensor for reading recorded images used for recording position corrections.

A specific aspect will be explained with reference to FIGS. 13 and 14. First, due to the locational relationship between a luminous flux provided by the sensor 106 and a recorded image x, an output waveform from the sensor 106 changes as shown in FIG. 13. Between luminous flux positions PA and PB, there is no recorded image, so the quantity of light reflected from the recording medium 114 is constant and highest. As the luminous flux position relatively moves from PB to PC and further to PD, the quantity of reflected light gradually decreases relative to the rate of an area of the luminous flux occupied by the recorded image. In addition, between the luminous flux positions PD and PE, all the luminous flux is contained on the recorded image x, so the quantity of reflected light is constant and lowest.

Figure 14:
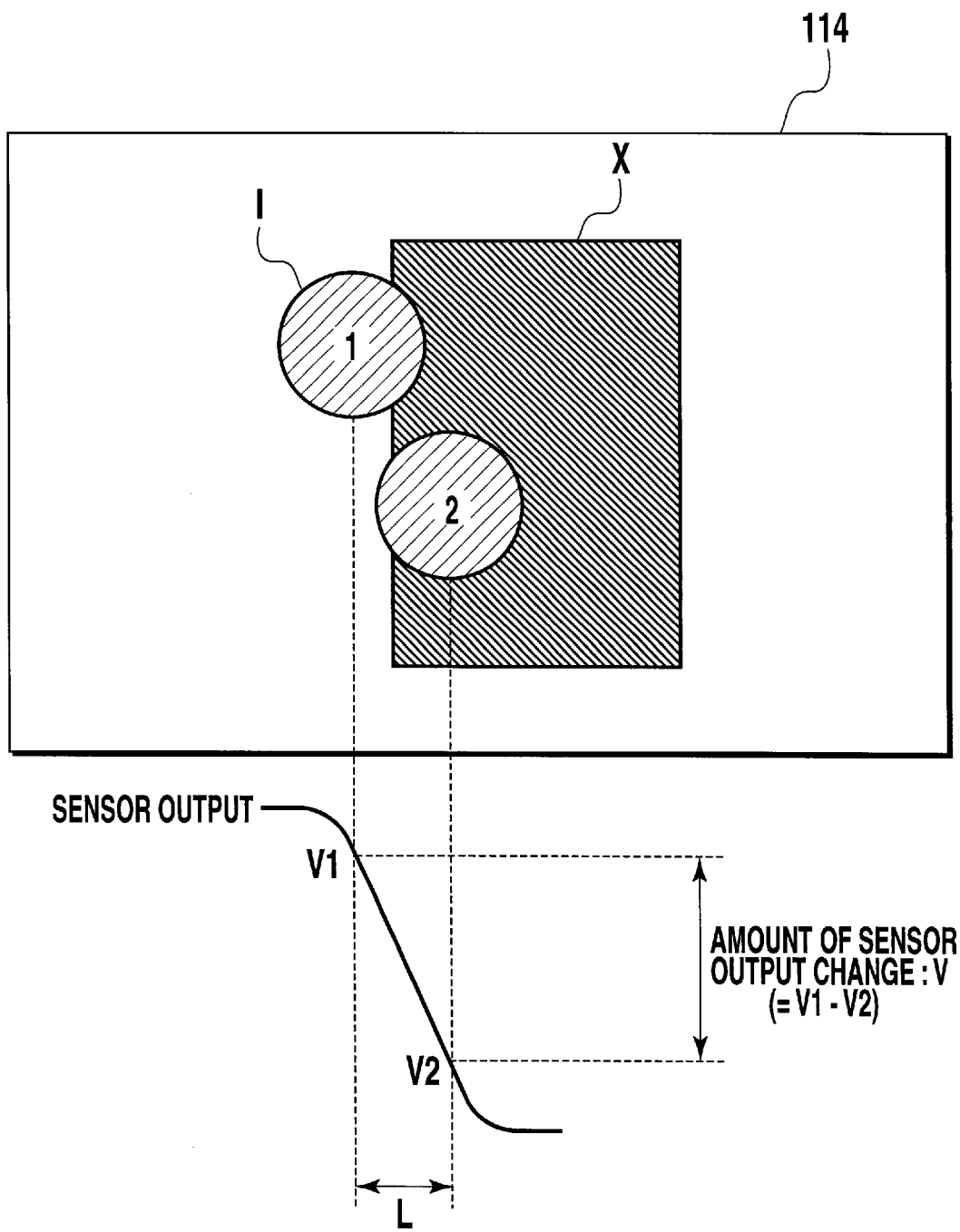
FIG. 14 is an explanatory drawing of processing for calculating the amount of changes in sensor output per unit distance that occur when the sensor is moved relative to recorded images used for recording position corrections.

Thus, as shown in FIG. 14, in the boundary between a portion in which the recorded image x is formed and a portion in which it is not formed, the carriage moving portion 320 and recording medium transfer portion 321 in FIG. 12 are used to scan the carriage relative to the recording medium 114 so as to irradiate two different positions P1 and P2 with a luminous flux I. Then, output values V1 and V2 from the sensor 106 and an amount of movement L by which the luminous flux I is relatively moved can be used to determined the sensor output change amount $\Delta V=(V1-V2)/L$ per unit distance. This processing is executed by the data processing portion 303 shown in FIG. 12. An output from the sensor 106 is input to the A/D converter 305, and the values V1 and V2 are stored in the sensor output value storage register 311.

For each recording position correction, the movement control portion 307 drives the carriage moving portion 320 or the recording medium transfer portion 321 by a predetermined amount, and passes this amount of movement L to the offset amount calculation portion 313. The offset amount calculation portion 313 determines the above $\Delta V$ using the values V1 and V2 stored in the sensor output storage register 311 as well as the amount of movement L. If the luminous flux has a circular cross section, a line joining the sensor outputs corresponding to the luminous flux positions PB, PC, and PD in FIG. 13 together is not exactly straight but can be approximated to a straight line within a limited range that uses the position PC as a reference. On the contrary, changes in the output from the sensor 106 can be calculated beforehand for corrections based on the calculated changes. Alternatively, the value $\Delta V$ can be determined for each of the main-scanning and sub-scanning directions so as to be used depending on the direction of the offset amount to be detected, thereby further improving the accuracy.

Next, a specific method for correcting the amount of offset of the image recording position in each direction will be described.

For each of the image patterns formed above for offset amount detection in each direction and in the boundary between a portion in which the recorded image x is formed and a portion in which it is not formed, a theoretical position corresponding to the position PC in FIG. 13 (a position at which the ratio of the portion with the image recorded therein to the area irradiated with light is exactly ½) is irradiated with a luminous flux from the sensor 106. At this point, if the recorded image is formed at the theoretical position without offset, the output obtained is such that the ratio of the portion with the image recorded therein to the area irradiated with light is exactly ½. The luminous flux is set at the theoretical position corresponding to the position PC in order to simplify the processing using an area obtained by linearly approximating the sensor output. By, for example, calculating changes in the output from the sensor 106 beforehand for corrections based on the calculated changes, as described above, the position need not be set so that the ratio of the area occupied by the recorded image to the area irradiated with the luminous flux is exactly ½.

Figure 15:
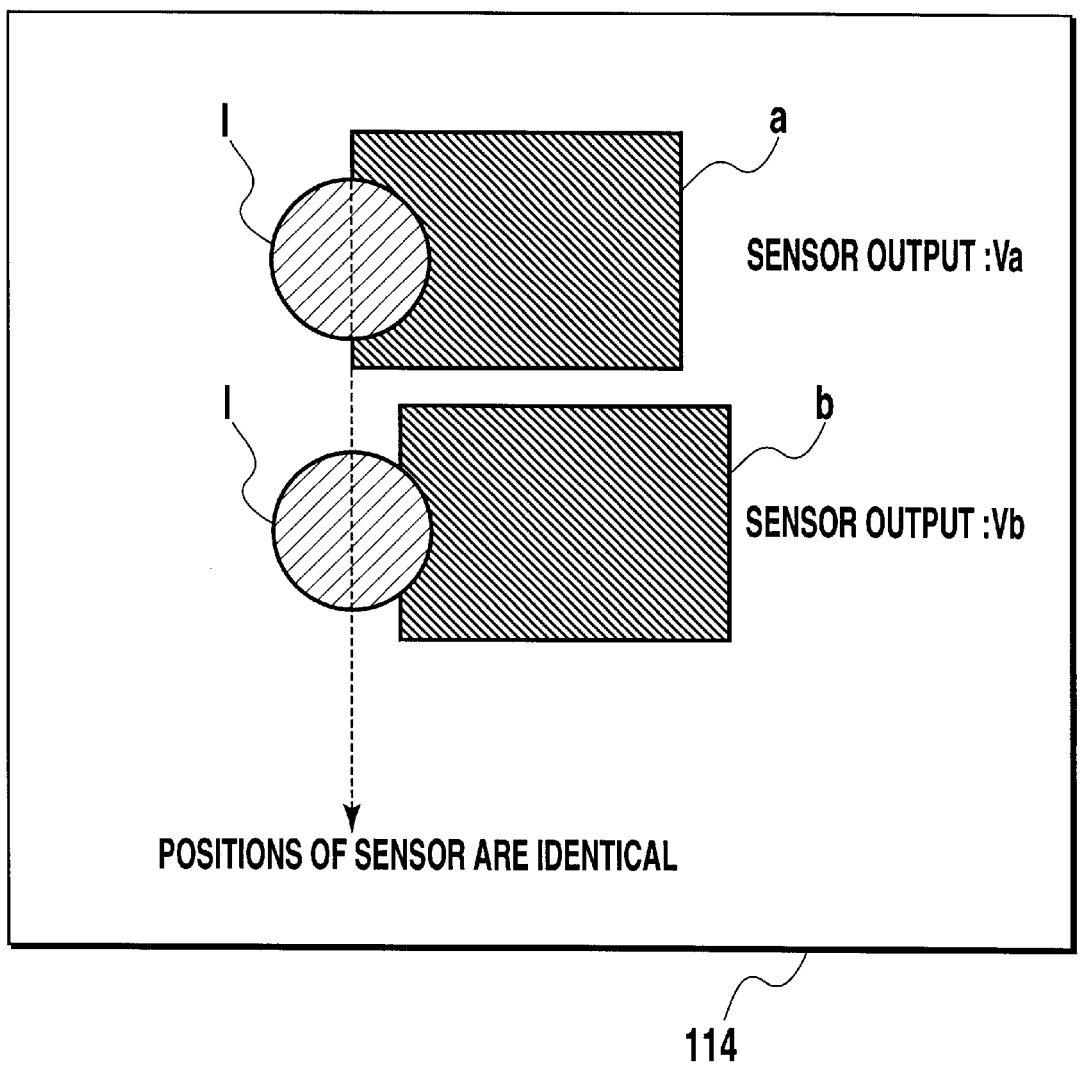
FIG. 15 is an explanatory drawing of processing for recording position corrections which calculates the amounts of offset of recording images.

Furthermore, as shown in FIG. 15, if recorded images (a) and (b) (for example, the recorded images a-H and b-H) for which the amount of offset is to be determined is irradiated with the luminous flux at their boundary in a direction (for example, the main scanning direction) for which offset is to be determined, the resulting sensor outputs Va and Vb and the previously determined $\Delta V$ can be used to calculate the amounts of offset of the recorded images $\Delta L=(Va-Vb)\times\Delta V$. The direction of image offset can also be determined based on the sign obtained, that is, the sign depending on the difference between Va and Vb in magnitude. If, for example, $\Delta L$ has a negative sign, the recorded image (b) is determined to be offset from the recorded image (a) to the right of FIG. 15 (for example, the recorded image b-H is offset from the recorded image a-H to the right of FIG. 11). This processing is carried out by the data processing portion 303 in FIG. 12.

Each of the amounts of offset determined (a correction value) is passed to the image recording position control portion 315. Based on these amounts of offset, the image recording position control portion 315 processes data on the recorded images for each recording head and adjusts recording timings for each recording head to control the subsequent image recording portion 317 so that the recording position on the recording medium obtained by each recording head will not be offset in the main scanning direction and the sub-scanning direction.

(4) Others

In each of the above embodiments, an example of an ink jet recording apparatus in which the ink is ejected from its recording head on a recording medium to form an image has been shown. However, the present invention is not limited to this configuration. The present invention is also applicable to a recording apparatus of any type which performs recording by moving its recording head and a recording medium relatively and to form dots.

However, in the case that an ink jet recording method is applied, the present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads : a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, according to the present invention, images recorded by recording heads mounted in a serial printer can be automatically and accurately corrected for positions on a recording medium in the main scanning direction and the sub-scanning direction. Even in a color printer with a plurality of separate recording heads, the present invention enables fast image recording in the two directions without color offset.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus for forming an image by means of main scanning as a reciprocating operation of a recording head and sub-scanning as a relative moving operation between the recording head and a recording medium in a direction different from the main scanning direction, comprising:

image formation means for forming a reference image at a first predetermined position on the recording medium during a forward direction main scanning of the recording head, the reference image extending in a sub-scanning direction, while forming particular images at second predetermined positions on the recording medium during the forward direction main scanning and a reverse direction main scanning of the recording head, wherein the first predetermined position is different from the second predetermined positions;

image detection means for performing main scanning on the recording medium to detect the reference image and the particular images formed during the forward direction main scanning and reverse direction main scanning;

measuring means for measuring an image interval in the main scanning direction between the reference image and each of the particular images formed during each of the forward direction main scanning and reverse direction main scanning, based on output from said image detection means; and data processing means for calculating the amount of offset between a recording position of the particular images formed during the forward direction main scanning and another recording position of the particular images formed during the reverse direction main scanning, based on measurements carried out by said measuring means.

2. A recording apparatus as claimed in claim 1, wherein said image detection means has a sensor placed on a carriage for allowing the recording head to carry out main scanning in the forward and reverse directions.

3. A recording apparatus as claimed in claim 1, wherein said measuring means has means for generating a reference clock and means for measuring the interval by counting said reference clock between a point of time at which said image detection means detects, through main scanning, the particular images formed during the forward direction main scanning and a point of time at which said image detection means detects the reference image through main scanning and between a point of time at which said image detection means detects, through main scanning, the particular images formed during the reverse direction main scanning and a point of time at which said image detection means detects the reference image through main scanning.

4. A recording apparatus as claimed in claim 3, wherein said reference clock generation means is also used as means for generating a clock for defining recording timings for the recording head.

5. A recording apparatus as claimed in claim 1, wherein said image detection means detects a quantity of reflected light resulting from irradiation of the recording medium with light, and has a sensor for indicating a change in the quantity of reflected light depending on whether the images are formed on the recording medium.

6. A recording apparatus as claimed in claim 5, wherein said measuring means measures the interval by measuring a time interval at which the quantity of reflected light changes while moving said sensor at a constant speed in the main scanning direction relative to the particular images, and multiplying the time interval by the speed.

7. A recording apparatus as claimed in claim 1, further comprising means for correcting recording data or timings for recording the image on the recording medium, based on the amount of offset of the recording positions determined by said data processing means.

8. A recording apparatus as claimed in claim 1, wherein the recording head is a head for performing recording by ejecting ink.

9. A recording apparatus as claimed in claim 8, wherein the recording head has heating elements for generating thermal energy to make the ink to film-boil, as an energy used for ejecting the ink.

10. A recording apparatus for forming an image by means of main scanning executed by a plurality of recording heads and sub-scanning as a relative moving operation between the recording heads and a recording medium in a direction different from the main scanning direction, comprising:

image formation means for forming a reference image at a first predetermined position on the recording medium during a forward direction main scanning of said plurality of recording heads, the reference image extending in a sub-scanning direction, while forming particular images at second predetermined positions on the recording medium during the forward direction main scanning and a reverse direction main scanning of the plurality of recording heads, wherein the first predetermined position is different from the second predetermined positions;

image detection means for performing scanning on the recording medium to detect the reference image and the particular images formed by the plurality of recording heads;

measuring means for measuring an image interval between the particular images formed by the plurality of recording heads, and for measuring another image interval in the main scanning direction between the reference image and each of the predetermined images formed during each of the forward direction main scanning and reverse direction main scanning, based on output from said image detection means; and data processing means for calculating the amounts of offset of recording positions of the particular images formed by the plurality of recording heads, based on measurements carried out by said measuring means.

11. A recording apparatus as claimed in claim 10, wherein said image detection means has a sensor placed on one carriage for integrally holding the plurality of recording heads for main scanning or one of a plurality of carriages for individually holding the plurality of recording heads for main scanning.

12. A recording apparatus as claimed in claim 10, wherein said measuring means has means for generating a reference clock and means for measuring the intervals by counting said reference clock between a point of time at which said image detection means detects, through main scanning, each of the particular images formed by each of the plurality of recording heads and a point of time at which said image detection means detects the reference image through main scanning.

13. A recording apparatus as claimed in claim 12, wherein said reference clock generation means is also used as means for generating a clock for defining recording timings for the recording heads.

14. A recording apparatus as claimed in claim 10, wherein said image detection means detects a quantity of reflected light resulting from irradiation of the recording medium with light, and has a sensor for indicating a change in said quantity of reflected light depending on whether the particular images are formed on the recording medium.

15. A recording apparatus as claimed in claim 14, wherein said measuring means measures the intervals by measuring a time interval at which said quantity of reflected light changes while moving said sensor at a constant speed relative to the particular images, and multiplying the time interval by said speed.

16. A recording apparatus as claimed in claim 10, further comprising means for correcting recording data or timings for recording the image on the recording medium, based on the amount of offset of the recording positions determined by said data processing means.

17. A recording apparatus as claimed in claim 10, wherein each one of the recording heads is a head for performing recording by ejecting ink.

18. A recording apparatus as claimed in claim 17, wherein each one of the recording heads has heating elements for generating thermal energy to make the ink to film-boil, as an energy used for ejecting the ink.

19. A recording apparatus for forming an image by means of main scanning executed by a plurality of recording heads and sub-scanning as a relative moving operation between the recording heads and a recording medium in a direction different from the main scanning direction, comprising:

image formation means for forming a reference image at a first predetermined position on the recording medium during a forward or reverse direction main scanning of one of the recording heads, the reference image extending in the main scanning direction, while forming particular images at second predetermined positions on the recording medium in the sub-scanning direction by using the plurality of recording heads, the first predetermined position being different from the second predetermined positions;

image detection means for performing sub-scanning on the recording medium to detect the reference image and the particular images formed by the recording heads; and measuring means for measuring an interval in the sub-scanning direction between the reference image and each of the particular images formed by each of the plurality of recording heads, based on output from said image detection means; and data processing means for calculating the amounts of offset of the recording positions of the particular images formed by the plurality of recording heads, based on measurements carried out by said measuring means.

20. A recording apparatus as claimed in claim 19, wherein said image detection means has a sensor placed on one carriage for integrally holding the plurality of recording heads for main scanning or one of a plurality of carriages for individually holding the plurality of recording heads for main scanning, and sets said carriage at a position in the main scanning direction at which said sensor detects the reference image and the particular images during sub-scanning of the recording medium.

21. A recording apparatus as claimed in claim 19, wherein said measuring means has means for generating a reference clock and means for measuring the intervals by counting said reference clock between a point of time at which said image detection means detects, through sub-scanning, each of the particular images formed by each of the plurality of recording heads and a point of time at which said image detection means detects the reference image through sub-scanning.

22. A recording apparatus as claimed in claim 21, wherein said reference clock generation means is also used as means for generating a clock for defining recording timings for the recording heads.

23. A recording apparatus as claimed in claim 19, wherein a drive source for said sub-scanning performs rotating motions, and wherein the particular images are formed at a position corresponding to integral multiples of a travel distance obtained by a single rotation of the drive source.

24. A recording apparatus for forming an image by means of main scanning as a reciprocating operation of a recording head and sub-scanning as a relative moving operation between the recording head and a recording medium in a direction different from the main scanning direction, comprising:

image formation means for forming a reference image at a first predetermined position on the recording medium during a forward direction main scanning of the recording head, the reference image extending in a sub-scanning direction, while forming particular images at second predetermined positions on the recording medium during the forward direction main scanning and a reverse direction main scanning of the recording head, wherein the first predetermined position is different from the second predetermined positions;

image detection means for performing main scanning on the recording medium to detect the reference image and the particular images formed during the forward direction main scanning and reverse direction main scanning; and data processing means for determining a center position of particular images in the main scanning direction from detection start and end positions of the particular images associated with main scanning by said image detection means, and calculating the amount of offset between a recording position of the particular images formed during the forward direction main scanning and another recording position of the particular images formed during the reverse direction main scanning, based on the main-scanning direction center positions of the particular images formed in the forward direction main scanning and reverse direction main scanning.

25. A recording apparatus as claimed in claim 24, wherein said image detection means detects a quantity of reflected light resulting from irradiation of the recording medium with light, and has a sensor for indicating a change in said quantity of reflected light depending on whether an image is formed on the recording medium.

26. A recording apparatus as claimed in claim 24, further comprising means for correcting recording data or timings for recording an image on the recording medium, based on the amount of offset of the recording positions determined by said data processing means.

27. A recording apparatus as claimed in claim 24, wherein the recording head is a head for performing recording by ejecting ink.

28. A recording apparatus as claimed in claim 27, wherein the recording head has heating elements for generating thermal energy to make the ink to film-boil, as an energy used for ejecting the ink.

29. A recording apparatus for forming an image by means of main scanning executed by a plurality of recording heads and sub-scanning as a relative moving operation between the recording heads and a recording medium in a direction different from the main scanning direction, comprising:

image formation means for forming a reference image at a first predetermined position on the recording medium during a forward or reverse direction main scanning of one of the recording heads, the reference image extending in the sub-scanning direction, while forming particular images at second predetermined positions on the recording medium by using the plurality of recording heads, wherein the first predetermined position is different from the second predetermined positions;

image detection means for scanning the recording medium to detect the reference image and the particular images formed by the plurality of recording heads; and data processing means for determining a center position of the particular images in a scanning direction of said image detection means, from detection start and end positions of the particular images associated with scanning by said image detection means, and calculating the amount of offset between recording positions of the particular images formed by the plurality of recording heads, based on the center positions of the particular images formed by the plurality of recording heads.

30. A recording apparatus as claimed in claim 29, wherein said image formation means forms the reference image at the predetermined position on the recording medium during the forward or reverse direction main scanning of one of the recording heads, the reference image extending in the main scanning direction, while forming particular images at the second predetermined positions on the recording medium in the sub-scanning direction using each of the plurality of recording heads, wherein the first predetermined position is different from that the second predetermined positions;

wherein said image detection means performs sub-scanning on the recording medium to detect the reference image and the particular images formed by the recording heads; and wherein said data processing means calculates the amount of offset based on the distance between the center position in said sub-scanning direction of each of the particular images formed by a corresponding one of the plurality of recording heads and the center position of the reference image in the sub-scanning direction.

31. A recording apparatus as claimed in claim 29, wherein said image detection means detects a quantity of reflected light resulting from irradiation of the recording medium with light, and has a sensor for indicating a change in the quantity of reflected light depending on whether an image is formed on the recording medium.

32. A recording apparatus as claimed in claim 29, further comprising means for correcting recording data or timings for recording an image on the recording medium, based on the amount of offset of the recording positions determined by said data processing means.

33. A recording apparatus as claimed in claim 29, wherein each one of the recording heads is a head for performing recording by ejecting ink.

34. A recording apparatus as claimed in claim 33, wherein each one of the recording heads has heating elements for generating thermal energy to make the ink to film-boil, as an energy used for ejecting the ink.

35. A recording apparatus for forming an image by allowing one or more recording heads to relatively scan a recording medium, comprising:

image formation means for forming particular images at predetermined positions on the recording medium by means of a plurality of recording operations performed by the one or more recording heads;

image detection means for detecting the particular images formed by each of the plurality of recording operations, said image detection means having a sensor for detecting a quantity of reflected light resulting from irradiation of the recording medium with light and indicating a change in the quantity of reflected light depending on a rate at which an image is present within a detection range; and data processing means for setting the sensor at an identical position in a scanning direction in a boundary portion of each of the particular images on the recording medium that are formed by each of the plurality of recording operations, in order to detect the quantity of light, and for calculating the amount of offset of recording positions of the images obtained by the plurality of recording operations based on the difference in the detected amount of reflected light.

36. A recording apparatus as claimed in claim 35, wherein in the boundary portion between a portion of the recording medium with an image formed therein and a portion with no image formed therein, said data processing means moves said sensor between at least two positions having different rates at which an image is present within the detection range, in order to calculate the amounts of offset of the recording positions of the images obtained by said plurality of recording operations, based on the quantities of reflected light at the two positions, the travel distance, and the difference.

37. A recording apparatus as claimed in claim 35, wherein said recording apparatus forms the image by means of main scanning as a reciprocating operation of the one or more recording heads and sub-scanning as a relative moving operation between the one or more recording heads and the recording medium in a direction different from the main scanning direction, said plurality of recording operations being performed in the forward direction main scanning and reverse direction main scanning;

wherein said image formation means forms the particular images at a theoretical identical position in said main scanning direction during each of the forward direction main scanning and reverse direction main scanning of the one or more recording heads; and wherein said data processing means sets said sensor at an identical position in said main scanning direction in the boundary portion of each of the particular images on the recording medium.

38. A recording apparatus as claimed in claim 35, wherein said recording apparatus forms the image by means of main scanning executed by the one or more recording heads and sub-scanning as a relative moving operation between the one or more recording heads and a recording medium in a direction different from the main scanning direction, the plurality of recording operations being performed by main scanning using the one or more recording heads, wherein:

said image formation means forms the particular images at a theoretical identical position in the main scanning direction by means of each of the one or more recording heads.

39. A recording apparatus as claimed in claim 35, wherein said recording apparatus forms the image by means of main scanning executed by the one or more recording heads and sub-scanning as a relative moving operation between the one or more recording heads and a recording medium in a direction different from the main scanning direction, said plurality of recording operations being performed by sub-scanning using the one or more recording heads, wherein:

said image formation means forms the particular images at a theoretical identical position in the sub-scanning direction by means of each of the one or more recording heads.

40. A recording apparatus as claimed in claim 35, further comprising means for correcting recording data or timings for recording the image on the recording medium, based on the amount of offset of the recording positions determined by said data processing means.

41. A recording apparatus as claimed in claim 35, wherein each one of the recording heads is a head for performing recording by ejecting ink.

42. A recording apparatus as claimed in claim 41, wherein each one of the recording heads has heating elements for generating thermal energy to make the ink to film-boil, as an energy used for ejecting the ink.

43. A recording position correcting method with respect to a recording apparatus for forming an image by means of main scanning as a reciprocating operation of a recording head and sub-scanning as a relative moving operation between the recording head and a recording medium in a direction different from the main scanning direction, said method comprising the steps of:

forming a reference image at a first predetermined position on the recording medium during a forward direction main scanning, the reference image extending in the sub-scanning direction, while forming particular images at second predetermined positions on the recording medium during the forward direction main scanning and a reverse direction main scanning of the recording head, wherein the first predetermined position is different from the second predetermined positions;

detecting the reference image and the particular images formed during the forward direction main scanning and reverse direction main scanning, by using image detection means for main scanning on the recording medium;

measuring an image interval in the main scanning direction between the reference image and each of the particular images formed during each of the forward direction main scanning and a reverse direction main scanning, based on output from said image detection means; and calculating the amount of offset between a recording position of the image formed during the forward direction main scanning and another recording position of the image formed during the reverse direction main scanning, based on measurements carried out by said measuring step.

44. A recording position correcting method with respect to a recording apparatus for forming an image by means of main scanning executed by a plurality of recording heads and sub-scanning as a relative moving operation between the recording heads and a recording medium in a direction different from the main scanning direction, said method comprising the steps of:

forming a reference image at a first predetermined position on the recording medium during a forward direction main scanning of the recording heads, the reference image extending in a sub-scanning direction, while forming particular images at second predetermined positions on the recording medium during the forward direction main scanning and a reverse direction main scanning of the plurality of recording heads, wherein the first predetermined position is different from the second predetermined positions;

detecting the reference image and the predetermined images formed by the plurality of recording heads by using image detection means for main scanning on the recording medium;

measuring an interval between the particular images formed by the plurality of recording heads, based on output from the image detection means;

measuring another interval in the main scanning direction between the reference image and each of the particular images formed during each of the forward direction main scanning and reverse direction main scanning, based on an output from the image detection means; and calculating the amounts of offset of recording positions of the images formed by the plurality of recording heads, based on measurements carried out by said measuring step.

45. A recording position correcting method with respect to a recording apparatus for forming an image by means of main scanning as a reciprocating operation of a recording head and sub-scanning as a relative moving operation between the recording head and a recording medium in a direction different from the main scanning direction, said method comprising the steps of:

forming a reference image at a first predetermined position on the recording medium during a forward direction main scanning of the recording head, the reference image extending in a sub-scanning direction, while forming particular images at second predetermined positions on the recording medium during the forward direction main scanning and reverse direction main scanning of the recording head, wherein the first predetermined position is different from the second predetermined positions;

detecting the reference image and the particular images formed during the forward direction main scanning and reverse direction main scanning, by using image detection means being main scanning on the recording medium; and determining a center position of the particular images in the main scanning direction from detection start and end positions of the particular images associated with main scanning by the image detection means, and calculating the amount of offset between a recording position of the particular images formed during the forward direction main scanning and another recording position of the particular images formed during the reverse direction main scanning, based on the main-scanning direction center positions of the particular images formed in the forward direction main scanning and reverse direction main scanning.

46. A recording position correcting method with respect to a recording apparatus for forming a image by means of main scanning executed by a plurality of recording heads and sub-scanning as a relative moving operation between the recording heads and a recording medium in a direction different from the main scanning direction, said method comprising the steps of:

forming a reference image at a first predetermined position on the recording medium during a forward or reverse direction main scanning of one of the recording heads, the reference image extending in a sub-scanning direction, while forming particular images at second predetermined positions on the recording medium by using the plurality of recording heads, wherein the first predetermined position is different from the second predetermined positions;

detecting the reference image and the predetermined images formed by the plurality of recording heads image, by using detection means being scanning on the recording medium; and determining a center position of the particular images in a scanning direction of the image detection means, from detection start and end positions of the particular images associated with scanning by the image detection means, and calculating the amount of offset between recording positions of the particular images formed by the plurality of recording heads, based on the center positions of the particular images formed by the plurality of recording heads.

47. A recording position correcting method with respect to a recording medium for forming an image by allowing one or more recording heads to relatively scan a recording medium, said method comprising the steps of:

forming particular images at predetermined positions on the recording medium by means of a plurality of recording operations performed by the one or more recording heads;

detecting the particular images formed by each of the plurality of recording operations, by using image detection means having a sensor for detecting a quantity of reflected light resulting from irradiation of the recording medium with light and indicating a change in the quantity of reflected light depending on a rate at which the image is present within a detection range; and setting said sensor at an identical position in a scanning direction in a boundary portion of each of the particular images on the recording medium that are formed by each of the plurality of recording operations, in order to detect the quantity of light, and calculating the amount of offset of recording positions of the images obtained by the plurality of recording operations based on the difference in the detected amount of reflected light.

* * * * *

UNITED STATES PATENT AND TRADEMARK OFFICE
CERTIFICATE OF CORRECTION

PATENT NO. : 6,607,260 B1
DATED : August 19, 2003
INVENTOR(S) : Tetsuhito Ikeda

It is certified that error appears in the above-identified patent and that said Letters Patent is hereby corrected as shown below:

Drawings,
Sheet 5, FIG. 5,
$T_3$, "image a-H" should read -- IMAGE c-H --; and
$T_4$, "image a-H" should read -- IMAGE d-H --.

Sheet 6, FIG. 6,
"$T_2$ COUNT" (second occurrence) should read -- $T_3$ COUNT --; and
"$T_1$ COUNT" (second occurrence) should read -- $T_4$ COUNT --.

Sheet 10, FIG. 10,
"IMAGE a-U" should read -- IMAGE a-V --.

Column 1,
Line 26, "movements" should read -- movement --.

Column 3,
Line 61, "detecting" should read -- detects --.

Column 5,
Line 25, "forth" should read -- fourth --; and
Line 57, "image" should read -- images --.

Column 7,
Lines 30 and 53, "a" should read -- an --.

Column 10,
Line 37, "represent to form" should read -- represents forming an --; and
Line 43, "to" should be deleted.

Column 30,
Line 21, "consists" should read -- consist --.

UNITED STATES PATENT AND TRADEMARK OFFICE
CERTIFICATE OF CORRECTION

PATENT NO.   : 6,607,260 B1
DATED        : August 19, 2003
INVENTOR(S)  : Tetsuhito Ikeda It is certified that error appears in the above-identified patent and that said Letters Patent is hereby corrected as shown below:

Column 35,
Line 63, "that" should read -- that of --.

Column 39,
Line 14, "forming a" should read -- forming an --.

Signed and Sealed this

Twenty-third Day of March, 2004

JON W. DUDAS
*Acting Director of the United States Patent and Trademark Office*